United States Patent
Iwaya et al.

(10) Patent No.: US 10,116,221 B2
(45) Date of Patent: Oct. 30, 2018

(54) SERIES COMPENSATING ELECTRIC POWER TRANSMISSION SYSTEM

(71) Applicant: TDK Corporation, Tokyo (JP)

(72) Inventors: Kazuki Iwaya, Tokyo (JP); Toshimasa Miyazaki, Nagaoka (JP); Kazu Shoji, Nagaoka (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 15/074,023

(22) Filed: Mar. 18, 2016

(65) Prior Publication Data
US 2016/0276941 A1 Sep. 22, 2016

(30) Foreign Application Priority Data

Mar. 19, 2015 (JP) .................................. 2015-056810

(51) Int. Cl.
*H02M 3/335* (2006.01)
*H02M 3/337* (2006.01)
*H02M 1/00* (2006.01)

(52) U.S. Cl.
CPC ..... *H02M 3/33584* (2013.01); *H02M 3/3376* (2013.01); *H02M 2001/0093* (2013.01)

(58) Field of Classification Search
CPC ..... H02M 3/33546; H02M 2001/0048; H02M 5/293; H02M 7/4807; H02M 3/33569; H02M 3/33584; H02M 3/3376
See application file for complete search history.

(56) References Cited

U.S. PATENT DOCUMENTS

2008/0205109 A1* 8/2008 Darroman ................. B60L 7/16
363/132
2013/0314950 A1* 11/2013 Hembach .......... H02M 3/33592
363/17

(Continued)

FOREIGN PATENT DOCUMENTS

JP 2002-272121 A 9/2002
JP 2012-044801 A 3/2012

OTHER PUBLICATIONS

Jun-ichi Itoh et al., "A New Approach for High Efficiency Buck-Boost DC/DC Converters Using Series Compensation", The Institute of Electrical Engineers of Japan, Transactions on Industry Applications, vol. 130, No. 1, 2010, p. 3 in English, pp. 18-25.

(Continued)

*Primary Examiner* — Adolf Berhane
*Assistant Examiner* — Henry Lee, III
(74) *Attorney, Agent, or Firm* — Harness, Dickey & Pierce, P.L.C.

(57) ABSTRACT

A series compensating electric power transmission system has an insulated type DC-DC converter that operates in the first through fourth quadrants, first and second DC voltage sources, and first and second power converters. In the converter, a first I/O positive terminal is connected to a first voltage source positive terminal. A first I/O negative terminal is connected to a first voltage source negative terminal. One of second I/O positive and negative terminals is connected to the first voltage source positive terminal. The other of the second I/O positive and negative terminals is connected to a second voltage source positive terminal. The first power converter converts power between the first I/O positive and negative terminals and first AC I/O terminals. The second power converter converts power between the second I/O positive and negative terminals and second AC I/O (Continued)

terminals. The second power converter is configured with a plurality of bidirectional switches.

9 Claims, 9 Drawing Sheets

(56) References Cited

U.S. PATENT DOCUMENTS

2015/0280595 A1* 10/2015 White ..................... H02P 1/30
318/778
2015/0381064 A1* 12/2015 Matsubara ........ H02M 3/33584
363/17

OTHER PUBLICATIONS

Japanese Office Action for JP Application No. 2015-056810, dated Aug. 21, 2018 (4 pages).

* cited by examiner

SERIES COMPENSATING ELECTRIC POWER TRANSMISSION SYSTEM

CROSS-REFERENCE TO RELATED APPLICATION

This application claims priority to Japanese Patent Application No. 2015-056810 filed Mar. 19, 2015 which is hereby expressly incorporated by reference herein in its entirety.

BACKGROUND

The present invention relates to a series compensating electric power transmission system that corresponds to an electric power transmission system in which electric power is transmitted bidirectionally between a first DC (direct current) voltage source and a second DC (direct current) voltage source. The series compensating electric power transmission system has a DC-DC converter that outputs a compensation voltage that corresponds to a voltage difference between the DC voltage sources.

Various series compensating electric power transmission systems are disclosed in Japanese Patent Publication Number 2012-44801 (pages 3-15 and FIGS. 2-14; various series compensating electric power transmission systems are disclosed as background and various series compensating electric power transmission systems are disclosed as embodiments).

As shown in FIG. 17, the series compensating electric power transmission system 101 mentioned above is basically configured with a primary side DC voltage source 11 (its output voltage (a DC voltage) corresponds to V1) as a first DC voltage source, a secondary side DC voltage source 12 (its output voltage (a DC voltage) corresponds to V2) as a second DC voltage source, and a DC-DC converter (a bidirectional DC-DC converter) 102 that outputs a compensation voltage Vconv, which corresponds to a voltage difference between the output voltages V1 and V2, by connecting output terminals between a positive voltage of the primary side DC voltage source 11 and a positive voltage of the secondary side DC voltage source 12 in series.

In the series compensating electric power transmission system 101, a negative output terminal of the primary side DC voltage source 11 and a negative output terminal of the secondary side DC voltage source are connected. Further, in regards to a pair of first DC input and output terminals P1 and P2 of the DC-DC converter 102, the first DC input and output terminal P1 that corresponds to a positive side is connected to a positive output terminal of the primary side DC voltage source 11, and the first DC input and output terminal P2 that corresponds to a negative side is connected to the negative output terminal of the primary side DC voltage source 11. Further, in regards to a pair of second DC input and output terminals Q1 and Q2 of the DC-DC converter 102, the second DC input and output terminal Q1 is connected to a positive output terminal of the secondary side DC voltage source 12, and the second DC input and output terminal Q2 is connected to the positive output terminal of the primary side DC voltage source 11.

In the series compensating electric power transmission system 101 that is disclosed as the embodiment among the various series compensating electric power transmission systems 101 disclosed in Japanese Patent Publication Number 2012-44801, the DC-DC converter 102 is shown in FIG. 18. As shown in FIG. 18, the DC-DC converter 102 is configured with a primary side power conversion unit 111, a high frequency transformer (an isolation transformer) 112 and a secondary side power conversion unit 113. Specifically, the primary side power conversion unit 111 has the pair of first DC input and output terminals P1 and P2 that are connected to the positive output terminal and the negative output terminal of the primary side DC voltage source 11, and at the same time, the primary side power conversion unit 111 converts the output voltage V1 into an AC (alternating current) voltage and outputs the AC voltage. The high frequency transformer (the isolation transformer) 112 receives the AC voltage as an input that is output from the primary side power conversion unit 111, converts it into another AC voltage and outputs the other AC voltage. The secondary side power conversion unit 113 outputs the compensation voltage Vconv based on the other AC voltage that is output from the high frequency transformer 112. As a result, the DC-DC converter 102 is configured as an insulated type DC-DC converter. In the embodiment of Japanese Patent Publication Number 2012-44801, it is disclosed that a full bridge type power converter or a half bridge type power converter can be used as the primary side power conversion unit 111 and the secondary side power conversion unit 113.

However, as schematically shown in FIG. 18, in the configuration of the DC-DC converter 102 that is disclosed in the embodiment of Japanese Patent Publication Number 2012-44801, two diodes are connected to two switches in parallel, respectively, between the pair of the second DC input and output terminals Q1 and Q2 (that is, between both positive output terminals of the output voltages V1 and V2). The two diodes are connected in series so as to be provided in a forward direction. In other words, current flow directions of the two diodes are the same to each other. Specifically, the two switches (in FIG. 18, as an example, field effect transistors) configure the secondary side power conversion unit 113 that corresponds to the bridge type power converter as explained above. Therefore, the DC-DC converter 102 can be operated only under a condition in which the output voltage V1 is lower than an output voltage V2, and output the voltage difference (V2−V1>0) between the output voltages V2 and V1 as the compensation voltage Vconv during a period of the above conditional operation. That is, in the series compensating electric power transmission system 101 that is disclosed in the embodiment of Japanese Patent Publication Number 2012-44801, the DC-DC converter 102 is operated only under the condition that satisfies an expression, V2>V1, so that the DC-DC converter 102 performs an operation of supplying the electric power to the secondary side DC voltage source 12 from the primary side DC voltage source 11 (a power-running operation) and an operation of supplying the electric power to the primary side DC voltage source 11 from the secondary side DC voltage source 12 (a regenerative operation).

On the other hand, in the series compensating electric power transmission system 101 (a series compensating electric power transmission system that is disclosed as a non-patent literature 3 in Japanese Patent Publication Number 2012-44801) that is disclosed in the background among the various series compensating electric power transmission systems 101 disclosed in Japanese Patent Publication Number 2012-44801, though a drawing is omitted, an insulated type DC-DC converter that is configured by combining a flyback converter (a converter body) with a H-Bridge is used as the DC-DC converter 102. Further, a DC-DC converter that is configured with a transformer-less polarity inversion chopper circuit (a circuit that has an H-Bridge circuit) is used as the DC-DC converter 102.

In the DC-DC converter 102 having the configuration explained above, because the H-bridge circuit performs a four-quadrant chopper operation in a time near switching between a step-up operation and a step-down operation according to a polarity of the voltage difference between the output voltages V1 and V2, it is possible to perform an operation of supplying the electric power to the secondary side DC voltage source 12 from the primary side DC voltage source 11 (a power-running operation in the first quadrant) and an operation of supplying electric power to the primary side DC voltage source 11 from the secondary side DC voltage source 12 (a regenerative operation in the fourth quadrant) under the condition in which the output voltage V1 is lower than the output voltage V2. At the same time, though there is no description regarding the operation including control methods in the non-patent literature, it is also possible to perform an operation of supplying the electric power to the secondary side DC voltage source 12 from the primary side DC voltage source 11 (a power-running operation in the second quadrant), and an operation of supplying electric power to the primary side DC voltage source 11 from the secondary side DC voltage source 12 (a regenerative operation in the third quadrant) under the condition in which the output voltage V1 is higher than the output voltage V2, according the disclosed configuration.

Among the insulated type DC-DC converters disclosed in Japanese Patent Publication Number 2012-44801, the DC-DC converter 102 of the series compensating electric power transmission system 101 that is disclosed in the background explained above can operate in the four quadrants by control. However, because a converter body has a two-stage configuration of the flyback converter and the H-Bridge, a configuration and control of the DC-DC converter are complicated. Therefore, there are problems to be solved, such as a decrease in conversion efficiency and an increasing in size of the converter body.

On the other hand, in regards to the DC-DC converter 102 explained above of the series compensating electric power transmission system 101 that is disclosed in the embodiment of Japanese Patent Publication Number 2012-44801, because just a converter body is needed, the problems in the DC-DC converter 102 that is disclosed in the background of Japanese Patent Publication Number 2012-44801 do not exist. However, as explained above, there is the problem that the electric power can be transmitted only under the condition in which the output voltage V1 is lower than the output voltage V2.

SUMMARY

The present invention is accomplished in order to solve these problems. An object of the present invention is to provide a series compensating electric power transmission system that can be operated in the four quadrants, and at the same time, is configured with only one-stage insulated type DC-DC converter.

In order to achieve the above object, a series compensating electric power transmission system includes: a first direct current voltage source that has a first voltage source positive terminal and a first voltage source negative terminal; a second direct current voltage source that has a second voltage source positive terminal and a second voltage source negative terminal; and a bidirectional DC-DC converter. The bidirectional DC-DC converter includes: a pair of first direct current input and output terminals configured with a first I/O positive terminal and a first I/O negative terminal, the first I/O positive terminal being connected to the first voltage source positive terminal, the first I/O negative terminal being connected to the first voltage source negative terminal; a pair of second direct current input and output terminals configured with a second I/O positive terminal and a second I/O negative terminal, one of the second I/O positive terminal and the second I/O negative terminal being connected to the first voltage source positive terminal, the other of the second I/O positive terminal and the second I/O negative terminal being connected to the second voltage source positive terminal; a first power converter (a first power conversion unit) having the pair of first direct current input and output terminals and a pair of first alternating current input and output terminals, the first power converter configured to bidirectionally perform power conversion between a first direct current voltage generated between the pair of first direct current input and output terminals and a first alternating current voltage generated between the pair of first alternating current input and output terminals; a second power converter (a second power conversion unit) having the pair of second direct current input and output terminals and a pair of second alternating current input and output terminals, the second power converter configured to bidirectionally perform power conversion between a second direct current voltage generated between the pair of second direct current input and output terminals and a second alternating current voltage generated between the pair of second alternating current input and output terminals; and an isolation transformer having a primary winding and a secondary winding, the primary winding being connected to the pair of first alternating current input and output terminals, the secondary winding being connected to the pair of second alternating current input and output terminals. The first power converter has a plurality of switches, and the plurality of switches are connected to each other in one of push-pull, half bridge and full bridge configurations. The first power converter has a plurality of bidirectional switches, and the plurality of bidirectional switches are connected to each other in one of half bridge and full bridge configurations. The plurality of switches and the plurality of bidirectional switches perform ON and OFF operations based on the first and second direct current voltages.

Further, in the series compensating electric power transmission system, each of the plurality of bidirectional switches is configured with two unidirectional switching elements and two diodes. The two unidirectional switching elements are connected in series in a state in which current flow directions of the two unidirectional switching elements are opposite to each other. The two diodes are connected in series in a state in which current flow directions of the two diodes are opposite to each other. The two unidirectional switching elements and the two diodes are connected in parallel, respectively, in a reversed polarity state (a conducting direction is opposite to a conducting direction of a unidirectional switch). The unidirectional switching element discussed above means, as a switching function, that a current flows in one direction when it is turned ON and that it has an enough voltage resistance (withstand voltage) against a voltage applied between both terminals of the switching element when it is turned OFF.

In a series compensating electric power transmission system according to embodiments of the present invention, a second power conversion unit (a second power converter) is configured with bidirectional switches. As a result, a bidirectional DC-DC converter, which is configured with only a first power conversion unit (a first power converter), the second power conversion unit and an isolation transformer, can transmit electric power bidirectionally by performing operations in each of the four quadrants regardless of both voltage levels of a first DC voltage source and a second DC voltage source.

Further, in the series compensating electric power transmission system according to the embodiments of the present invention, the bidirectional switch is configured with a pair of unidirectional switching elements, which are connected in series in an opposite direction to each other (in a state in which current flow directions of the two unidirectional switching elements are opposite to each other) and a pair of diodes, which are connected in series in an opposite direction to each other (in a state in which current flow directions of the two diodes are opposite to each other) and which are connected to the pair of unidirectional switching elements in parallel, respectively. Therefore, the series compensating electric power transmission system according to the embodiments of the present invention can easily configure the bidirectional switch by using general electric components.

DESCRIPTION OF EXEMPLARY EMBODIMENTS

A series compensating electric power transmission system according to an embodiment of the present invention is explained below with reference to the drawings.

Figures 1, 2:
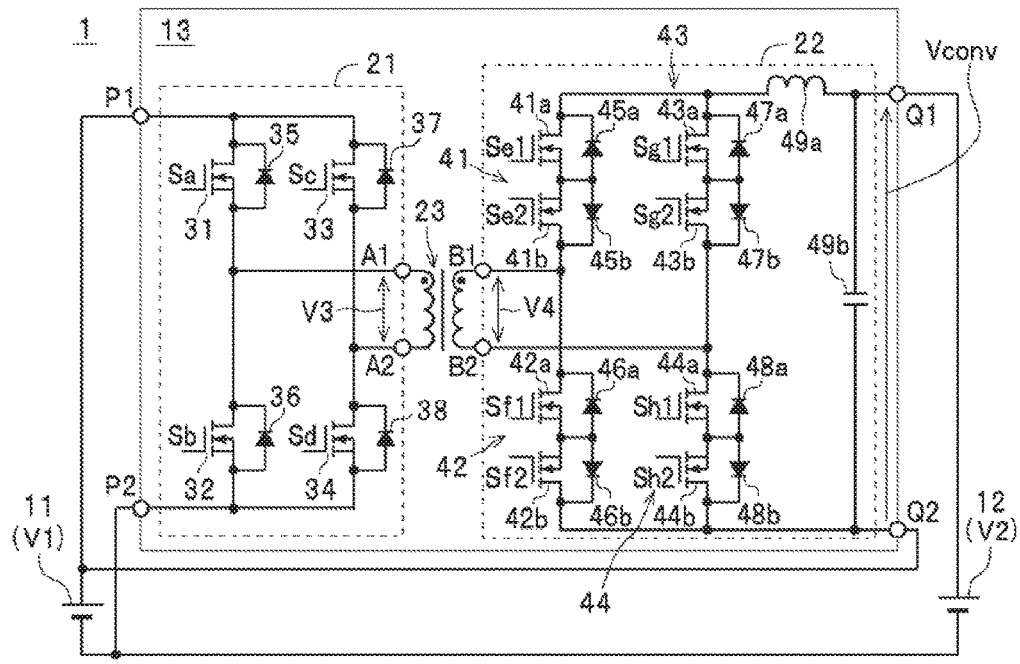
FIG. 1 is a circuit diagram that shows a series compensating electric power transmission system 1 and a converter 13 according to an embodiment of the present invention.
FIG. 2 is a schematic view for explaining operations of each aspect of the four quadrants of the converter 13 according to an embodiment of the present invention.

A series compensating electric power transmission system 1 (also referred to as "an electric power transmission system 1") as the series compensating electric power transmission system shown in FIG. 1 is, as an example, configured with a first DC (direct current) voltage source 11 (a voltage source that outputs an output voltage V1 that corresponds to a direct current), a second DC (direct current) voltage source 12 (a voltage source that outputs an output voltage V2 that corresponds to a direct current) and a bidirectional DC-DC converter 13 (also referred to as "an converter 13"). The converter 13 is configured to perform operations in four aspects shown in FIG. 2 (a four-quadrant chopper operation).

Specifically, in the converter 13, a first DC input and output terminal P1 that corresponds to a positive terminal of a pair of first DC (direct current) input and output terminals P1 and P2 is connected to a positive output terminal of the first DC voltage source and a first DC input and output terminal P2 that corresponds to a negative terminal is connected to a negative output terminal of the first DC voltage source 11. Further, in the converter 13, a second DC input and output terminal Q2 of a pair of second DC (direct current) input and output terminals Q1 and Q2 is connected to the positive output terminal of the first DC voltage source 11, and at the same time, a second DC input and output terminal Q1 is connected to a positive output terminal of the second DC voltage source 12.

As explained above, the converter 13 that is connected between the first DC voltage source 11 and the second DC voltage source 12 performs a power-running operation for compensating a voltage difference between the output voltages V1 and V2 based on the output voltage V1 (that is, outputting a compensation voltage Vconv for compensating the voltage difference) as a single converter. Further, the converter 13 also performs a regenerative operation for putting electric power back to the output voltage V1 based on the voltage difference between the output voltages V1 and V2 as the single converter.

As shown in FIG. 2, in the first and second quadrants, the electric power transmission system 1 performs the power-running operation for transmitting the electric power (supplying an electric current) from the first DC voltage source 11 to the second DC voltage source 12. Specifically, in the first quadrant in which there is a condition of the output voltages V1 and V2, V1<V2, the converter 13 performs the power-running operation (an operation in the first quadrant) so as to output the compensation voltage Vconv based on the output voltage V1. Further, in the second quadrant in which there is a condition of the output voltages V1 and V2, V1>V2, the converter 13 performs the regenerative operation (an operation in the second quadrant) so as to put the electric power back to the output voltage V1 based on the voltage difference between the output voltages V1 and V2.

Further, as shown in FIG. 2, in the third and fourth quadrants, the electric power transmission system performs the regenerative operation for transmitting the electric power (supplying an electric current) from the second DC voltage source 12 to the first DC voltage source 11. Specifically, in the third quadrant in which there is a condition of the output voltages V1 and V2, V1>V2, the converter 13 performs the power-running operation (an operation in the third quadrant) so as to output the compensation voltage Vconv based on the output voltage V1. Further, in the fourth quadrant in which there is a condition of the output voltages V1 and V2, V1<V2, the converter 13 performs the regenerative operation (an operation in the fourth quadrant) so as to put the electric power back to the output voltage V1 based on the voltage difference between the output voltages V1 and V2.

As exemplarily shown in FIG. 1, the converter is configured with a first power conversion unit (a first power converter) 21, a second power conversion unit (a second power converter) 22 and an isolation transformer 23. Further, the converter 13 also has a control unit that is not shown. The control unit receives a setting instruction from outside of a voltage to be controlled (a controlled voltage), a target voltage of the controlled voltage and an input and output electric current limit value. Further, the control unit follows the setting instruction and performs an ON and OFF control of four switches 31, 32, 33 and 34 explained below of the first power conversion unit 21 and an ON and OFF control of four bidirectional switches 41, 42, 43 and 44 explained below of the second power conversion unit 22 in order to stabilize the controlled voltage to be the target voltage according to states of the output voltage (a voltage value) V1 of the first DC voltage source 11 and the output voltage (a voltage value) V2 of the second DC voltage source 12. Specifically, the control unit generates driving signals (driving signals Sa, Sb, Sc, Sd, Se1, Se2, Sf1, Sf2, Sg1, Sg2, Sh1 and Sh2 shown in FIGS. 3 and 4) explained below and outputs these driving signals to make the first power conversion unit 21 and the second power conversion unit 22 perform the operations (i.e., the electric power transmission system 1 performs either the power-running operation or the regenerative operation, and the DC-DC converter performs either the power-running operation or the regenerative operation) in the four quadrants explained above according to the setting instruction from outside and the states of the output voltage (the voltage value) V1 of the first DC voltage source 11 and the output voltage (the voltage value) V2 of the second DC voltage source 12 of that time.

The first power conversion unit 21 is, as an example, configured with the four switches 31, 32, 33 and 34 that are connected with the full bridge form, diodes 35, 36, 37 and 38, a pair of DC (direct current) input and output terminals (because they are the pair of first DC input and output terminals P1 and P2 of the converter 13 in the present embodiment, they are also referred to as "first DC input and output terminals P1 and P2" below), and a pair of first AC (alternating current) input and output terminals A1 and A2. Specifically, each of the diodes 35, 36, 37 and 38 is connected in parallel in an opposite polarity (so-called an inverse-parallel connection) to each of the switches 31, 32, 33 and 34, respectively. The first power conversion unit 21 mutually performs power conversions between a direct current that is generated between the first DC input and output terminals P1 and P2 and an alternating current (a first AC voltage V3) that is generated between the pair of first AC input and output terminals A1 and A2. Specifically, the direct current mentioned above corresponds to the output voltage V1 having a polarity in which a voltage of the first DC input and output terminal P1 has a high potential with respect to a voltage of the first DC input and output terminal P2. Here, when a conducting direction of a unidirectional switch, which is in an ON state, is defined as one direction while the DC-DC converter performs the power-running operation, the opposite polarity means an opposite direction of the one direction.

Specifically, each of the switches 31, 32, 33 and 34 is, as an example, configured by an N channel MOSFET (Metal Oxide Semiconductor Field Effect Transistor). Further, because a parasitic diode exists in the MOSFET, the parasitic diode can be used as each of the diodes 35, 36, 37 and 38 instead of using the independent/separate diodes 35, 36, 37 and 38. Further, as each of the switches 31, 32, 33 and 34, for instance, other semiconductor switching elements such as an npn type bipolar transistor or an IGBT (Insulated Gate Bipolar Transistor) can also be used.

The four switches 31, 32, 33 and 34 are divided into two switch groups (a group of the switches 31 and 32, and a group of the switches 33 and 34) in which the two switches in the same group are connected in series, and the two switch groups are connected with each other in parallel. In this way, a full-bridge circuit is configured with the four switches 31, 32, 33 and 34.

In the first power conversion unit 21, one node (a node located at a current inflow side when conduction occurs) of two nodes, which connect between the group of the switches 31, 32 and the group of the switches 33, 34, is connected to the first DC input and output terminal P1. At the same time, the other node (a node located at a current outflow side when the conduction occurs) of the two nodes is connected to the first DC input and output terminal P2. Further, in the first power conversion unit 21, a node connected between the switches 31 and 32 in the group of the switches 31 and is connected to the first AC input and output terminal A1, and at the same time, a node connected between the switches 33 and 34 in the group of the switches 33 and 34 is connected to the first AC input and output terminal A2.

The first power conversion unit 21 with this configuration explained above performs the power conversions explained above because the switches 31, 32, and 34 perform switching operations (perform chopper operations) by the driving signals Sa, Sb, Sc and Sd that are respectively supplied to the switches 31, 32, 33 and 34.

The second power conversion unit 22 is, as an example, configured with the four bidirectional switches 41, 42, 43 and 44 that are connected with the full bridge form, diodes 45a, 45b, 46a, 46b, 47a, 47b, 48a and 48b, a coil 49a, a capacitor 49b, a pair of DC (direct current) input and output terminals (because they are the pair of second DC input and output terminals Q1 and Q2 of the converter 13 in the present embodiment, they are also referred to as "second DC input and output terminals Q1 and Q2" below) and at least a pair of second AC (alternating current) input and output terminals (the number of the second AC input and output terminals is determined by the configuration of a secondary winding of the isolation transformer 23. In this embodiment, because of only one secondary winding, there are two terminals, i.e., a pair of second AC input and output terminals B1 and B2). Each of the bidirectional switches 41, 42, 43 and 44 is configured with two switches. Specifically, the bidirectional switch 41 is configured with unidirectional switching elements 41a and 41b (also referred to as "switches 41a and 41b"), the bidirectional switch 42 is configured with unidirectional switching elements 42a and 42b (also referred to as "switches 42a and 42b"), the bidirectional switch 43 is configured with unidirectional switching elements 43a and 43b (also referred to as "switches 43a and 43b") and the bidirectional switch 44 is configured with unidirectional switching elements 44a and 44b (also referred to as "switches 44a and 44b"). The diodes 45a, 45b, 46a, 46b, 47a, 47b, 48a and 48b are respectively connected to the unidirectional switching elements (switches) 41a, 41b, 42a, 42b, 43a, 43b, 44a, and 44b that configure the four bidirectional switches 41, 42, 43 and 44 mentioned above in in parallel in an opposite polarity, i.e., in an inverse-parallel connection. The second power conversion unit 22 mutually performs power conversions between a direct current (a voltage difference between the output voltages V1 and V2) that is generated between the second DC input and output terminals Q1 and Q2 and an alternating current (a second AC voltage V4) that is generated between the pair of second AC input and output terminals B1 and B2.

Specifically, each of the switches 41a, 41b, 42a, 42b, 43a, 43b, 44a and 44b is, as an example of a unidirectional switching element, configured by an N channel MOSFET. Further, because a parasitic diode exists in the MOSFET, the parasitic diode can be used as each of the diodes 45a-48b instead of using the independent/separate diodes 45a-48b in each of the switches 41a-44b that are configured by the MOSFETs. Further, as each of the switches 41a, 41b . . . 44a and 44b, for instance, other semiconductor switching elements such as an npn type bipolar transistor or an IGBT (Insulated Gate Bipolar Transistor) can also be used.

The switches 41a and 41b configure the single bidirectional switch 41 as a whole by being connected to each other in series in an opposite polarity (in the embodiment, the two MOSFETs that configure the switches 41a and 41b are connected in series because source terminals of the MOSFETs are connected to each other). In the same manner as explained above, the switches 42a and 42b configure the single bidirectional switch 42 as a whole by being connected to each other in series in an opposite polarity, the switches 43a and 43b configure the single bidirectional switch 43 as a whole by being connected to each other in series in an opposite polarity, and the switches 44a and 44b configure the single bidirectional switch 44 as a whole by being connected to each other in series in an opposite polarity.

The four bidirectional switches 41, 42, 43 and are divided into two bidirectional switch groups (a group of the bidirectional switches 41 and 42, and a group of the bidirectional switches 43 and 44) in which the two bidirectional switches in the same group are connected in series, and the two bidirectional switch groups are connected with each other in parallel. In this way, a full-bridge circuit is configured with the four bidirectional switches 41, 42, 43 and 44.

In the second power conversion unit 22, one of two nodes, which connect between the group of the bidirectional switches 41, 42 and the group of the bidirectional switches 43, 44, is connected to one end of the coil 49a, and the other end of the coil 49a is connected to the second DC input and output terminal Q1. In this case, as a connecting location of the coil 49a, it can also be adopted that the one end of the coil 49a is connected to the other of two nodes, which connect between the group of the bidirectional switches 41, 42 and the group of the bidirectional switches 43, 44, and the other end of the coil 49a is connected to the second DC input and output terminal Q2. Further, in the second power conversion unit 22, the other of the two nodes of the two groups of the bidirectional switches explained above is connected to the second DC input and output terminal Q2. Also, in the second power conversion unit 22, a node connected between the bidirectional switches and 42 each other in the group of the bidirectional switches 41 and 42 is connected to the second AC input and output terminal B1, and at the same time, a node connected between the bidirectional switches 43 and 44 each other in the group of the bidirectional switches 43 and 44 is connected to the second AC input and output terminal B2. Further, in the second power conversion unit 22, the capacitor 49b is connected between a pair of second DC input and output terminals Q1 and Q2.

The second power conversion unit 22 with this configuration explained above performs the power conversions explained above because the switches 41a, 41b, 42a, 42b, 43a, 43b, 44a and 44b perform switching operations (perform chopper operations) by the driving signals Se1, Se2, Sf1, Sf2, Sg1, Sg2, Sh1 and Sh2 that are respectively supplied to the switches 41a, 41b, 42a, 42b, 43a, 43b, 44a and 44b.

As exemplarily shown in FIG. 1, the isolation transformer 23 has two windings (a primary winding and a secondary winding) that are electrically insulated to each other. Further, the primary winding of the isolation transformer 23 is connected to the first AC input and output terminals A1 and A2 and the secondary winding of the isolation transformer 23 is connected to the second AC input and output terminals B1 and B2. Therefore, in the following explanation, ends of the primary winding are also referred to as "the first AC input and output terminal A1" and "the first AC input and output terminal A2", respectively, and ends of the secondary winding are also referred to as "the second AC input and output terminal B1" and "the second AC input and output terminal B2", respectively. Further, in the isolation transformer 23, the primary winding and the secondary winding are wound with a polarity in a state in which when a voltage that is higher than that of the first AC input and output terminal A2 is applied to the first AC input and output terminal A1, a voltage that is higher than that of the second AC input and output terminal B2 is generated at the second AC input and output terminal B1.

Next, an operation of the electric power transmission system 1 according to the present embodiment is explained with reference to the example in every quadrant shown in FIG. 2. Further, in order to comprehend the invention easily, the conversion efficiency of the DC-DC converter 13 corresponds to 100% (no internal loss) and the second DC voltage source 12, as an example, corresponds to a secondary battery that is freely charged and discharged. Further, in the electric power transmission system 1, a controlled voltage (a voltage to be controlled) corresponds to the output voltage V2 of the second DC voltage source 12. When the output voltage V2 of the second DC voltage source 12 is less than a rated voltage thereof, the electric power transmission system 1 supplies the electric power (performing a power-running operation) from the first DC voltage source 11 to the second DC voltage source 12 so as to charge the second DC voltage source 12. On the other hand, when the output voltage V2 of the second DC voltage source 12 is more than the rated voltage thereof, the electric power transmission system 1 supplies the electric power (performing a regenerative operation) from the second DC voltage source 12 to the first DC voltage source 11 by discharging the second DC voltage source 12.

Firstly, when the output voltage V2 is less than the rated voltage Vr (for instance, when the rated voltage Vr is 100V, the output voltage V2 is 98V), the electric power transmission system 1 performs the power-running operation and supplies the electric power from the first DC voltage source 11 to the second DC voltage source 12. In this case, when the output voltage V2 is more than the output voltage V1 (for instance, when the output voltage V1 is 90V), the electric power transmission system 1 performs the operation in the first quadrant and supplies the electric power to the second DC voltage source 12. Therefore, the instruction in which an operation quadrant corresponds to the first quadrant is input to the control unit. As a result, the control unit generates the driving signals Sa, Sb, Sc, Sd, Se1, Se2, Sf1, Sf2, Sg1, Sg2, Sh1 and Sh2 at the timings shown in FIG. 3 and outputs these driving signals to the first power conversion unit 21 and the second power conversion unit 22.

In the electric power transmission system 1, the first power conversion unit 21 and the second power conversion unit 22 of the converter 13 perform the chopper operations at the timings (shown in FIG. 3) of the driving signals Sa, Sb, Sc, Sd, Se1, Se2, Sf1, Sf2, Sg1, Sg2, Sh1 and Sh2. As a result, a charging operation is possible in a state in which a current value of a charging current is controlled. Further, the electric power that the second DC voltage source 12 receives is equal to the electric power that the first DC voltage source 11 outputs.

Specifically, because an expression, V2−V1>0, is satisfied in the operation in the first quadrant, a voltage difference (V2−V1), in which the voltage (the output voltage V2) of the second DC input and output terminal Q1 has a higher potential with respect to the voltage (the output voltage V1) of the second DC input and output terminal Q2 as a reference voltage, is generated between the second DC input and output terminals Q1 and Q2 as shown in FIG. 2.

As a result, only certain switches are turned ON at certain periods as explained below. A power transmission occurs in each of two periods T1 and T2 in one cycle T with respect to the driving signals Sa–Sh2 shown in FIG. 3. During the period T1, in the first power conversion unit 21, only the switches 31 and 34 shift to be in the ON states by the driving signals Sa and Sd. Further, during the period T1, in the second power conversion unit 22, only the bidirectional switches 41 and 44 shift to be in the ON states by the driving signals Se1, Se2, Sh1 and Sh2.

Figure 5:
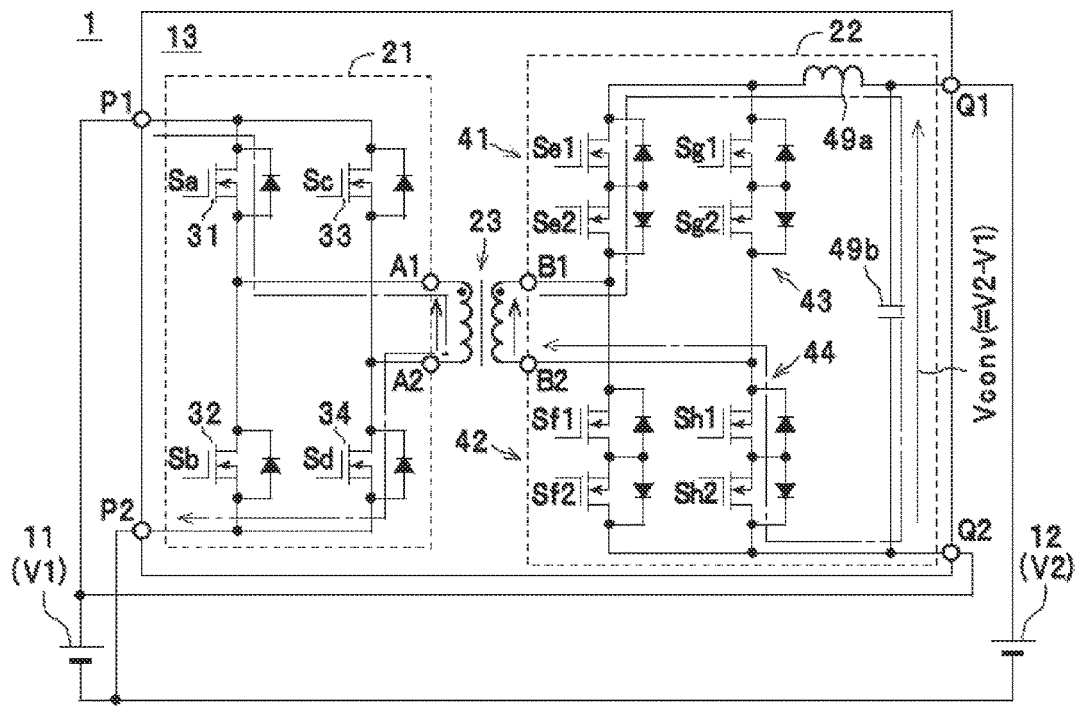
FIG. 5 is a circuit diagram for explaining an operation in the first quadrant of the series compensating electric power transmission system 1 according to an embodiment of the present invention.

As a result, as shown in FIG. 5, in the first power conversion unit 21, an electric current based on the output voltage V1 and a series compensating electric power (the voltage difference (V2−V1)×(the charging current to the second DC voltage source 12)) flows in a path (a path shown by an alternate long and short dash line) starting from the first DC input and output terminal P1 on the high potential side and ending to the first DC input and output terminal P2 on the low potential side, via the switch 31 being in the ON state, the primary winding of the isolation transformer 23 and the switch 34 being in the ON state. Further, in the second power conversion unit 22, an electric current based on a voltage (a voltage in which a polarity is shown in FIG. 5 in regards to the AC voltage V4) that is induced at the secondary winding of the isolation transformer 23 flows in a path (a path shown by an alternate long and short dash line) starting from the second AC input and output terminal B1 of the secondary winding of the isolation transformer 23 and ending to the second AC input and output terminal B2 of the secondary winding of the isolation transformer 23, via the bidirectional switch 41 being in the ON state by the driving signals Se1 and Se2, the coil 49a, the capacitor 49b, and the bidirectional switch 44 being in the ON state by the driving signals Sh1 and Sh2. That is, during the period T1, the converter 13 outputs the compensation voltage Vconv (the voltage difference and the compensation voltage Vconv that is an enough voltage value to flow the electric current), which corresponds to the voltage difference between the output voltages V1 and V2 with the same polarity as the output voltage V1, between both terminals of the capacitor 49b. Thus, the converter 13 itself performs the power-running operation and supplies a part of the electric power, which is directly supplied to the second DC voltage source 12 from the first DC voltage source 11, to the second DC voltage source 12.

Further, during the period T2 explained above and shown in FIG. 3, in the first power conversion unit 21, only the switches 32 and 33 shift to be in the ON states by the driving signals Sb and Sc. Further, in the second power conversion unit 22, only the bidirectional switches 42 and 43 shift to be in the ON states by the driving signals Sf1, Sf2, Sg1 and Sg2.

Figure 6:
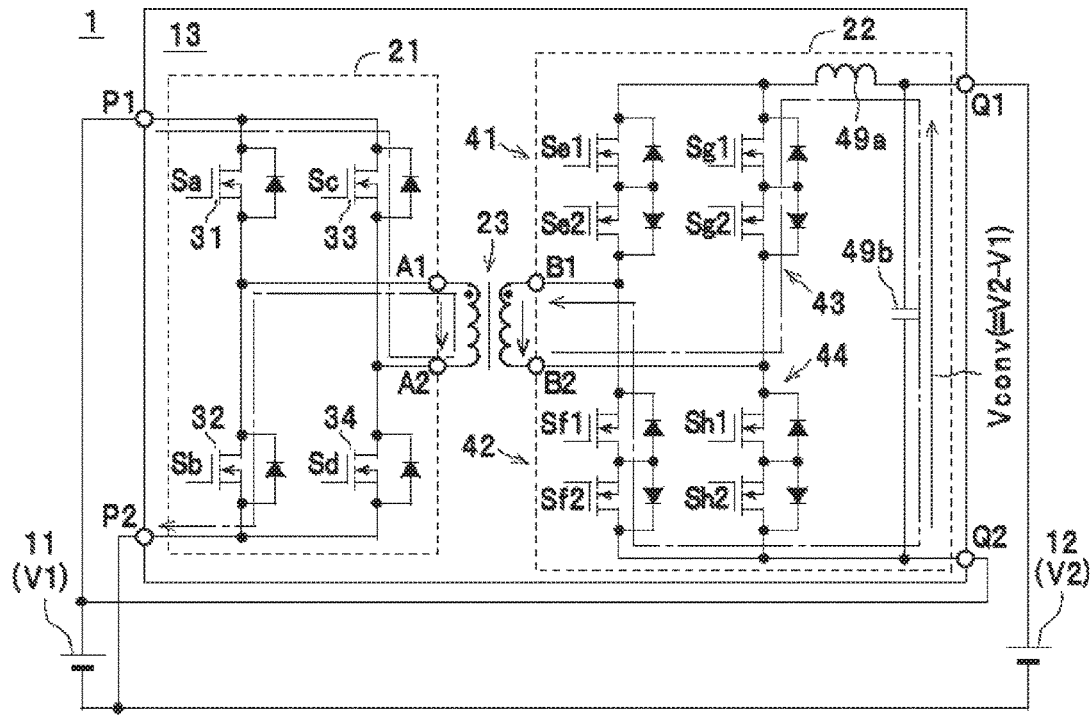
FIG. 6 is another circuit diagram for explaining the operation in the first quadrant of the series compensating electric power transmission system 1 according to an embodiment of the present invention.

As a result, as shown in FIG. 6, also during the period T2 explained above, in the first power conversion unit 21, an electric current based on the output voltage V1 and the series compensating electric power (the voltage difference (V2−V1)×(the charging current to the second DC voltage source 12)) flows in a path (a path shown by an alternate long and short dash line) starting from the first DC input and output terminal P1 on the high potential side and ending to the first DC input and output terminal P2 on the low potential side, via the switch 33 being in the ON state, the primary winding of the isolation transformer 23 and the switch 32 being in the ON state. Further, in the second power conversion unit 22, an electric current based on a voltage (a voltage in which a polarity is shown in FIG. 6 in regards to the AC voltage V4) that is induced at the secondary winding of the isolation transformer 23 flows in a path (a path shown by an alternate long and short dash line) starting from the second AC input and output terminal B2 of the secondary winding of the isolation transformer 23 and ending to the second AC input and output terminal B1 of the secondary winding of the isolation transformer 23, via the bidirectional switches 43 being in the ON state by the driving signals Sg1 and Sg2, the coil 49a, the capacitor 49b, and the bidirectional switch 42 being in the ON state by the driving signals Sf1 and Sf2. That is, in the same manner as the period T1, during the period T2, the converter 13 also outputs the compensation voltage Vconv (the voltage difference and the compensation voltage Vconv that is an enough voltage value to flow the electric current), which corresponds to the voltage difference between the output voltages V1 and V2 with the same polarity as the output voltage V1, between both terminals of the capacitor 49b. Thus, the converter 13 itself performs the power-running operation and supplies a part of the electric power, which is directly supplied to the second DC voltage source 12 from the first DC voltage source 11, to the second DC voltage source 12.

As discussed above, in the electric power transmission system 1, because the converter 13 also performs the power-running operation, a part of the electric power that is supplied to the second DC voltage source 12 from the first DC voltage source 11 is superposed on the first DC voltage source 11 via the converter 13. Further, an amount of the superposition is controlled during each of the periods T1 and T2 shown in FIG. 3. As a result, the current value of the charging current that is supplied to the second DC voltage source 12 from the first DC voltage source 11 is controlled (for instance, that is controlled to be a constant current value). Therefore, during both of the periods T1 and T2 in each cycle T, because the charging current flows (i.e., the electric power is supplied to the second DC voltage source 12) from the first DC voltage source 11 to the second DC voltage source 12 via the converter 13, the second DC voltage source 12 is charged.

At this time, the output voltage V2 of the second DC voltage source 12 gradually increases by the charging operation, and as a result, the voltage difference (V2−V1) also gradually increases. At the same time, the control unit makes the compensation voltage Vconv increase according to the increase of the output voltage V2 by controlling timings of the driving signals Sa, Sb, Sc, Sd, Se1, Se2, Sf1, Sf2, Sg1, Sg2, Sh1 and Sh2. As a result, in the electric power transmission system 1, the output voltage (the compensation voltage) Vconv of the converter 13 is controlled and the electric power that is superposed on the first DC voltage source 11 is adjusted until the output voltage V2 increases and reaches the rated voltage Vr. As a result, the second DC voltage source is charged in a constant-current control mode in which a charging current value is controlled indirectly. While a part of the charging power explained above is superposed (added) on the first DC voltage source 11 via the converter 13, the operations (the power-running operation of the electric power transmission system 1) for supplying the charging power from the first DC voltage source 11 to the second DC voltage source 12 continue.

Further, after the output voltage V2 approaches and is close to the rated voltage Vr, the control unit controls the timings of the driving signals Sa, Sb, Sc, Sd, Se1, Se2, Sf1, Sf2, Sg1, Sg2, Sh1 and Sh2 and controls the output voltage (the compensation voltage) Vconv of the converter 13 by switching from the constant-current control to the constant-voltage control. As a result, the output voltage V2 of the second DC voltage source 12 is maintained to be the rated voltage Vr.

Secondly, when the output voltage V2 is less than the rated voltage Vr (for instance, when the rated voltage Vr is 100V, the output voltage V2 is 98V), the electric power transmission system 1 performs the power-running operation and supplies the electric power from the first DC voltage source 11 to the second DC voltage source 12. In this case, when the output voltage V2 is less than the output voltage V1 (for instance, when the output voltage V1 is 110V), the electric power transmission system 1 performs the operation in the second quadrant and supplies the electric power to the second DC voltage source 12. Therefore, the instruction in which an operation quadrant corresponds to the second quadrant is input to the control unit. As a result, the control unit generates the driving signals Sa, Sb, Sc, Sd, Se1, Se2, Sf1, Sf2, Sg1, Sg2, Sh1 and Sh2 at the timings shown in FIG. 4 and outputs these driving signals to the first power conversion unit 21 and the second power conversion unit 22.

In the electric power transmission system 1, the first power conversion unit 21 and the second power conversion unit 22 of the converter 13 perform the chopper operations at the timings (shown in FIG. 4) of the driving signals Sa, Sb, Sc, Sd, Se1, Se2, Sf1, Sf2, Sg1, Sg2, Sh1 and Sh2. As a result, a charging is possible in a state in which a current value of a charging current is controlled. Further, the electric power that the second DC voltage source 12 receives is equal to the electric power that the first DC voltage source 11 outputs.

Specifically, because an expression, V2−V1<0, is satisfied in the operation in the second quadrant, a voltage difference (V1−V2), in which the voltage (the output voltage V1) of the second DC input and output terminal Q2 has a higher potential with respect to the voltage (the output voltage V2) of the second DC input and output terminal Q1 as a reference voltage, is generated between the second DC input and output terminals Q1 and Q2 as shown in FIG. 2.

As a result, only certain switches are turned ON at certain periods as explained below. A power transmission occurs in each of two periods T1 and T2 in one cycle T with respect to the driving signals Sa–Sh2 shown in FIG. 4. During the period T1, in the second power conversion unit 22, the bidirectional switches 42 and 43 shift to be in the ON states by the driving signals Sf1, Sf2, Sg1 and Sg2. On the other hand, the bidirectional switches 41 and 44 are controlled to be in OFF states. The second power conversion unit 22 is completely configured with the bidirectional switches 41, 42, 43 and 44. Thus, even when the voltage having any polarity is applied to both terminals of any of the bidirectional switches 41, 42, 43 and 44 while they are in the OFF states, it is possible to prevent an electric current from passing between the both terminals. In the first power conversion unit 21, only the switches 31 and shift to be in the ON states by the driving signals Sa and Sd. It is not required that the switches 31 and 34 are in the ON states because of the diodes 35 and 38. However, it is possible to decrease an internal loss by turning ON the switches 31 and 34.

Figure 7:
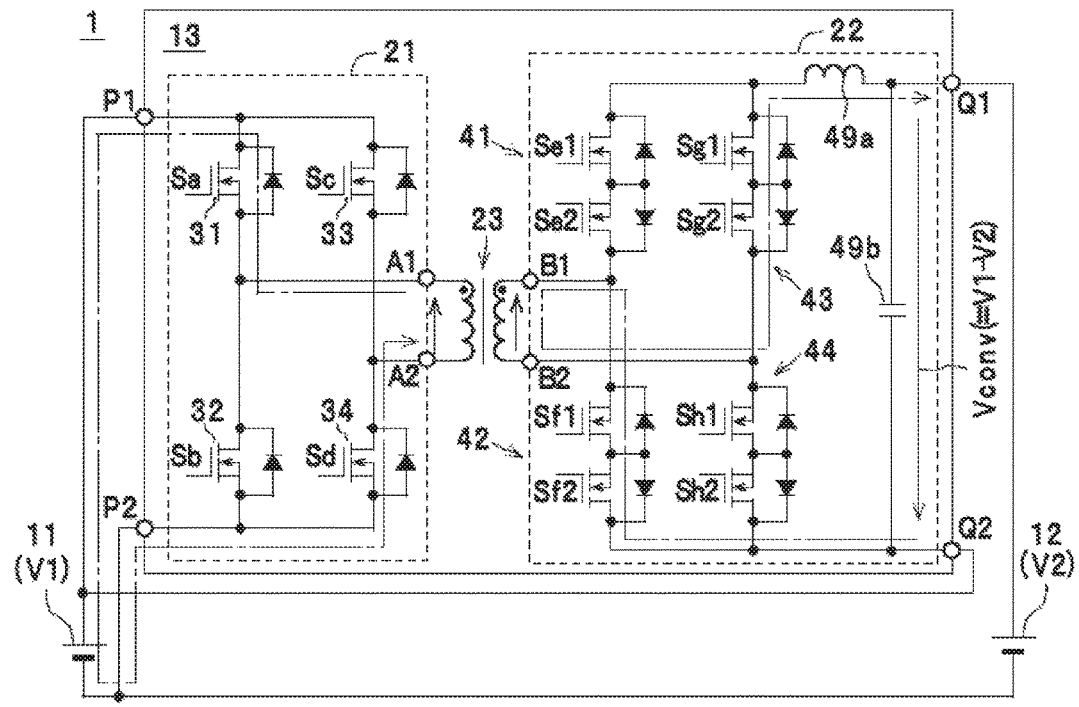
FIG. 7 is a circuit diagram for explaining an operation in the second quadrant of the series compensating electric power transmission system 1 according to an embodiment of the present invention.

As a result, as shown in FIG. 7, in the second power conversion unit 22, an electric current based on the output voltage V2 and a series compensating electric power (the voltage difference (V1−V2)×(the charging current to the second DC voltage source 12)) flows in a path (a path shown by an alternate long and short dash line) starting from the second DC input and output terminal Q2 on the high potential side and ending to the second DC input and output terminal Q1 on the low potential side, via the bidirectional switch 42 being in the ON state, the secondary winding of the isolation transformer 23, the bidirectional switch 43 being in the ON state and the 49a. Further, in the first power conversion unit 21, an electric current based on a voltage (a voltage in which a polarity is shown in FIG. 7 in regards to the AC voltage V3) that is induced at the primary winding of the isolation transformer 23 flows in a path (a path shown by an alternate long and short dash line) starting from the first AC input and output terminal A1 of the primary winding of the isolation transformer 23 and ending to the first AC input and output terminal A2 of the primary winding of the isolation transformer 23, via the switch 31 being in the ON state by the driving signal Sa, the first DC voltage source 11, and the switch 34 being in the ON state by the driving signal Sd. That is, during the period T1, the converter 13 applies the compensation voltage Vconv (the voltage difference and the compensation voltage Vconv that is an enough voltage value to flow the electric current), which corresponds to the voltage difference between the output voltages V1 and V2 with the same polarity as the output voltage V2, to both terminals of the capacitor 49b. Thus, the converter 13 itself performs the regenerative operation and returns a part of the electric power, which is directly supplied to the second DC voltage source 12 from the first DC voltage source 11, to the first DC voltage source 11.

Further, during the period T2 explained above and shown in FIG. 4, in the second power conversion unit 22, the bidirectional switches 41 and 44 shift to be in the ON states by the driving signals Se1, Se2, Sh1 and Sh2. On the other hand, the bidirectional switches 42 and 43 are controlled to be in the OFF states. Further, in the first power conversion unit 21, only the switches 32 and 33 shift to be in the ON states by the driving signals Sb and Sc. It is not required that the switches 32 and 33 are in the ON states because of the diodes 36 and 37. However, it is possible to decrease an internal loss by turning ON the switches 32 and 33.

Figure 8:
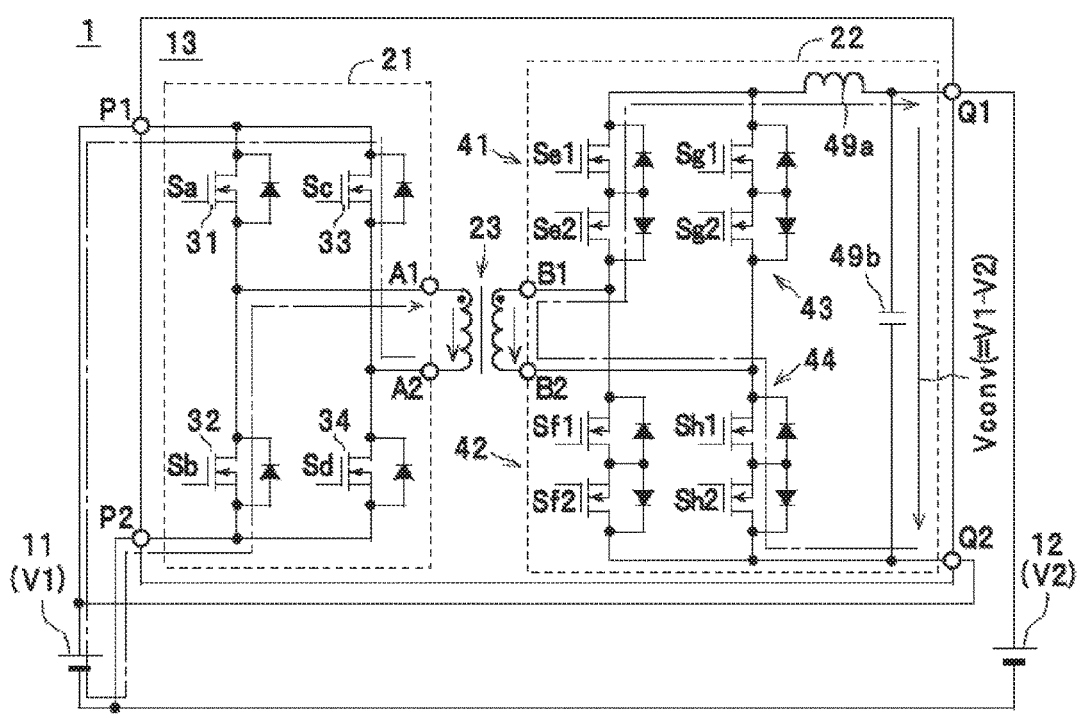
FIG. 8 is another circuit diagram for explaining the operation in the second quadrant of the series compensating electric power transmission system 1 according to an embodiment of the present invention.

As a result, as shown in FIG. 8, also during the period T2 explained above, in the second power conversion unit 22, an electric current based on the output voltage V2 and the series compensating electric power (the voltage difference (V1−V2)×(the charging current to the second DC voltage source 12)) flows in a path (a path shown by an alternate long and short dash line) starting from the second DC input and output terminal Q2 on the high potential side and ending to the second DC input and output terminal Q1 on the low potential side, via the bidirectional switch 44 being in the ON state, the secondary winding of the isolation transformer 23, the bidirectional switch 41 being in the ON state, and the coil 49a. Further, in the first power conversion unit 21, an electric current based on a voltage (a voltage in which a polarity is shown in FIG. 8 in regards to the AC voltage V3) that is induced at the primary winding of the isolation transformer 23 flows in a path (a path shown by an alternate long and short dash line) starting from the first AC input and output terminal A2 of the primary winding of the isolation transformer 23 and ending to the first AC input and output terminal A1 of the primary winding of the isolation transformer 23, via the switch 33 being in the ON state by the driving signal Sc, the first DC voltage source 11, and the switch 32 being in the ON state by the driving signal Sb. That is, in the same manner as the period T1, also during the period T2, the converter 13 applies the compensation voltage Vconv (the voltage difference and the compensation voltage Vconv that is an enough voltage value to flow the electric current), which corresponds to the voltage difference between the output voltages V1 and V2 with the same polarity as the output voltage V2, to both terminals of the capacitor 49b. Thus, the converter 13 itself performs the regenerative operation and returns a part of the electric power, which is directly supplied to the second DC voltage source 12 from the first DC voltage source 11, to the first DC voltage source 11.

As discussed above, in the electric power transmission system 1, because the converter 13 performs the regenerative operation, a part of the electric power, which is supplied to the second DC voltage source 12 from the first DC voltage source 11, is returned to the first DC voltage source 11 via the converter 13. Further, an amount of the return is controlled during each of the periods T1 and T2 explained above and shown in FIG. 4. As a result, the current value of the charging current that is supplied to the second DC voltage source 12 from the first DC voltage source 11 is controlled (for instance, that is controlled to be a constant current value). Therefore, during both of the periods T1 and T2 in each cycle T, the electric power transmission system 1 charges the second DC voltage source 12 by supplying the charging current in which the current value is controlled to the second DC voltage source 12 from the first DC voltage source 11 via the converter 13.

At this time, the output voltage V2 of the second DC voltage source 12 gradually increases by the charging operation, and as a result, the voltage difference (V1−V2) gradually decreases in contrast. At this time, the control unit makes the compensation voltage Vconv decrease according to the increase of the output voltage V2 by controlling timings of the driving signals Sa, Sb, Sc, Sd, Se1, Se2, Sf1, Sf2, Sg1, Sg2, Sh1 and Sh2. As a result, in the electric power transmission system 1, the output voltage (the compensation voltage) Vconv of the converter 13 is controlled and the electric power that is returned to the first DC voltage source 11 is adjusted until the output voltage V2 increases and reaches the rated voltage Vr. As a result, the second DC voltage source is charged in a constant-current control mode in which a charging current value is controlled indirectly. While a part of the charging power explained above is returned (subtracted) to the first DC voltage source 11 via the converter 13, the operations (the power-running operation of the electric power transmission system 1) for supplying the charging power from the first DC voltage source 11 to the second DC voltage source 12 continue.

Further, after the output voltage V2 approaches and is close to the rated voltage Vr, the control unit controls the timings of the driving signals Sa, Sb, Sc, Sd, Se1, Se2, Sf1, Sf2, Sg1, Sg2, Sh1 and Sh2 and controls the applied voltage (the compensation voltage) Vconv to the converter 13 by switching from the constant-current control to the constant-voltage control. As a result, the output voltage V2 of the second DC voltage source 12 is maintained to be the rated voltage Vr.

Thirdly, when the output voltage V2 is more than the rated voltage Vr (for instance, when the rated voltage Vr is 100V, the output voltage V2 is 102V), the electric power transmission system 1 performs the regenerative operation and supplies (returns) the electric power to the first DC voltage source 11 from the second DC voltage source 12. In this case, when the output voltage V1 is more than the output voltage V2 (for instance, when the output voltage V1 is 110V), the electric power transmission system 1 performs the operation in the third quadrant and supplies the electric power to the first DC voltage source 11. Therefore, the instruction in which an operation quadrant corresponds to the third quadrant is input to the control unit. As a result, the control unit generates the driving signals Sa, Sb, Sc, Sd, Se1, Se2, Sf1, Sf2, Sg1, Sg2, Sh1 and Sh2 at the timings shown in FIG. 4 and outputs these driving signals to the first power conversion unit 21 and the second power conversion unit 22.

In the electric power transmission system 1, the first power conversion unit 21 and the second power conversion unit 22 of the converter 13 perform the chopper operations at the timings (shown in FIG. 4) of the driving signals Sa, Sb, Sc, Sd, Se1, Se2, Sf1, Sf2, Sg1, Sg2, Sh1 and Sh2. As a result, a discharging is possible in a state in which a current value of a discharging current is controlled. Further, the electric power that the first DC voltage source 11 receives is equal to the electric power that the second DC voltage source 12 outputs.

Specifically, because an expression, V2−V1<0, is satisfied in the operation in the third quadrant, a voltage difference (V1−V2), in which the voltage (the output voltage V1) of the second DC input and output terminal Q2 has the higher potential with respect to the voltage (the output voltage V2) of the second DC input and output terminal Q1 as a reference voltage, is generated between the second DC input and output terminals Q1 and Q2 as shown in FIG. 2.

As a result, only certain switches are turned ON at certain periods as explained below. A power transmission occurs in each of two periods T1 and T2 in one cycle T with respect to the driving signals Sa–Sh2 shown in FIG. 4. During the period T1, in the first power conversion unit 21, only the switches 31 and 34 shift to be in the ON states by the driving signals Sa and Sd. Further, in the second power conversion unit 22, only the bidirectional switches 42 and 43 shift to be in the ON states by the driving signals Sf1, Sf2, Sg1 and Sg2.

Figure 9:
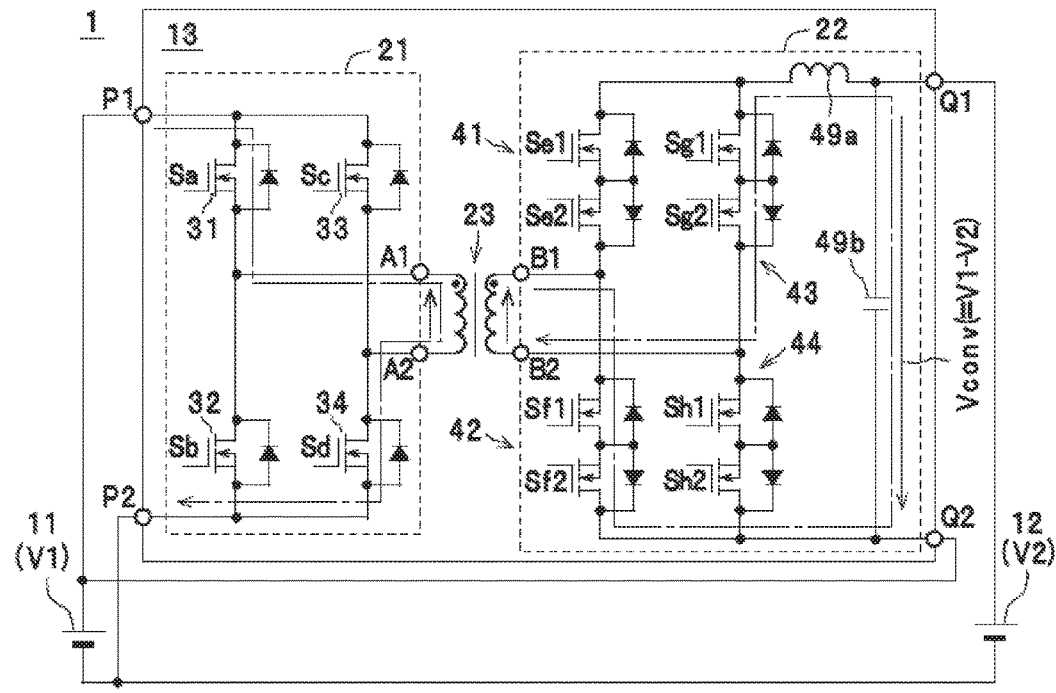
FIG. 9 is a circuit diagram for explaining an operation in the third quadrant of the series compensating electric power transmission system 1 according to an embodiment of the present invention.

As a result, as shown in FIG. 9, in the first power conversion unit 21, an electric current based on the output voltage V1 and a series compensating electric power (the voltage difference (V1−V2)×(the regenerative current from the second DC voltage source 12)) flows in a path (a path shown by an alternate long and short dash line) starting from the first DC input and output terminal P1 on the high potential side and ending to the first DC input and output terminal P2 on the low potential side, via the switch 31 being in the ON state, the primary winding of the isolation transformer 23 and the switch 34 being in the ON state. Further, in the second power conversion unit 22, an electric current based on a voltage (a voltage in which a polarity is shown in FIG. 9 in regards to the AC voltage V4) that is induced at the secondary winding of the isolation transformer 23 flows in a path (a path shown by an alternate long and short dash line) starting from the second AC input and output terminal B1 of the secondary winding of the isolation transformer 23 and ending to the second AC input and output terminal B2 of the secondary winding of the isolation transformer 23, via the bidirectional switch 42 being in the ON state by the driving signals Sf1 and Sf2, the capacitor 49b, the coil 49a, and the bidirectional switch 43 being in the ON state by the driving signals Sg1 and Sg2. That is, during the period T1, the converter 13 outputs the compensation voltage Vconv (the voltage difference and the compensation voltage Vconv that is an enough voltage value to flow the electric current), which corresponds to the voltage difference between the output voltages V1 and V2 with the same polarity as the output voltage V2, between both terminals of the capacitor 49b. Thus, the converter 13 itself performs the power-running operation and supplies a part of the electric power, which is directly supplied to the first DC voltage source 11 from the second DC voltage source 12, to the first DC voltage source 11.

Further, during the period T2 explained above and shown in FIG. 4, in the first power conversion unit 21, only the switches 32 and 33 shift to be in the ON states by the driving signals Sb and Sc. Further, in the second power conversion unit 22, only the bidirectional switches 41 and 44 shift to be in the ON states by the driving signals Se1, Se2, Sh1 and Sh2.

Figure 10:
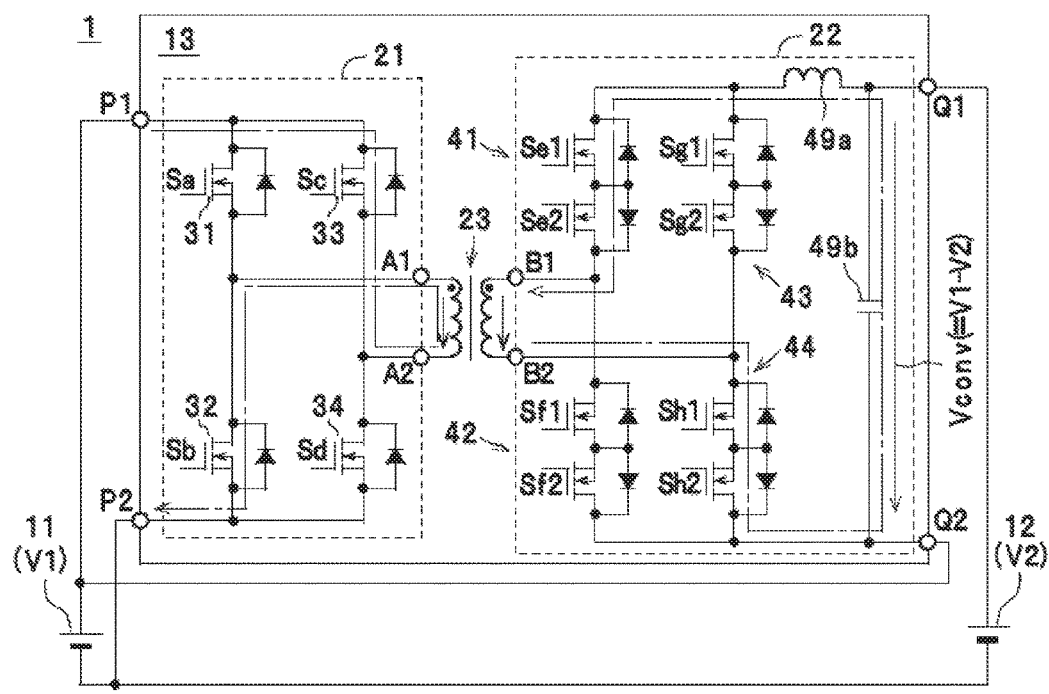
FIG. 10 is another circuit diagram for explaining the operation in the third quadrant of the series compensating electric power transmission system 1 according to an embodiment of the present invention.

As a result, as shown in FIG. 10, also during the period T2 explained above, in the first power conversion unit 21, an electric current based on the output voltage V1 and the series compensating electric power (the voltage difference (V1−V2)×(the regenerative current from the second DC voltage source 12)) flows in a path (a path shown by an alternate long and short dash line) starting from the first DC input and output terminal P1 on the high potential side and ending to the first DC input and output terminal P2 on the low potential side, via the switch 33 being in the ON state, the primary winding of the isolation transformer 23 and the switch 32 being in the ON state. Further, in the second power conversion unit 22, an electric current based on a voltage (a voltage in which a polarity is shown in FIG. 10 in regards to the AC voltage V4) that is induced at the secondary winding of the isolation transformer 23 flows in a path (a path shown by an alternate long and short dash line) starting from the second AC input and output terminal B2 of the secondary winding of the isolation transformer 23 and ending to the second AC input and output terminal B1 of the secondary winding of the isolation transformer 23, via the bidirectional switch 44 being in the ON state by the driving signals Sh1 and Sh2, the capacitor 49b, the coil 49a, and the bidirectional switch 41 being in the ON state by the driving signals Se1 and Se2. That is, in the same manner as the period T1, during the period T2, the converter 13 also outputs the compensation voltage Vconv (the voltage difference and the compensation voltage Vconv that is an enough voltage value to flow the electric current), which corresponds to the voltage difference between the output voltages V1 and V2 with the same polarity as the output voltage V2, between both terminals of the capacitor 49b. Thus, the converter 13 itself performs the power-running operation and supplies a part of the electric power, which is directly supplied to the first DC voltage source 11 from the second DC voltage source 12, to the first DC voltage source 11.

As discussed above, in the electric power transmission system 1, because the converter 13 performs the power-running operation, a part of the electric power that is supplied to the first DC voltage source 11 from the second DC voltage source 12 is superposed on the second DC voltage source 12 via the converter 13. Further, an amount of the superposition is controlled during each of the periods T1 and T2 shown in FIG. 4. As a result, the current value of the regenerative current that is supplied to the first DC voltage source from the second DC voltage source 12 is controlled (for instance, that is controlled to be a constant current value). Therefore, during both of the periods T1 and T2 in each cycle T, because the superposed voltage (V2+Vconv) of adding the compensation voltage Vconv to the output voltage V2 is higher than the output voltage V1, the electric power that is discharged from the second DC voltage source 12 is supplied (is returned) to the first DC voltage source 11 via the converter 13.

At this time, the output voltage V2 of the second DC voltage source 12 gradually decreases by the discharging operation, and as a result, the voltage difference (V2−V1) gradually increases in contrast. At this time, the control unit makes the compensation voltage Vconv increase according to the decrease of the output voltage V2 by controlling timings of the driving signals Sa, Sb, Sc, Sd, Se1, Se2, Sf1, Sf2, Sg1, Sg2, Sh1 and Sh2. As a result, in the electric power transmission system 1, the output voltage (the compensation voltage) Vconv of the converter 13 is controlled and the electric power that is superposed on the second DC voltage source 12 is adjusted until the output voltage V2 decreases and reaches the rated voltage Vr. As a result, the electric power is discharged from the second DC voltage source 12 in a constant-current control mode in which a charging current value is controlled indirectly. While a part of discharging power explained above is superposed (added) on the second DC voltage source 12 via the converter 13, the operations (the regenerative operation of the electric power transmission system 1) for supplying the discharging power from the second DC voltage source 12 to the first DC voltage source 11 continues.

Further, after the output voltage V2 approaches and is close to the rated voltage Vr, the control unit controls the timings of the driving signals Sa, Sb, Sc, Sd, Se1, Se2, Sf1, Sf2, Sg1, Sg2, Sh1 and Sh2 and controls the output voltage (the compensation voltage) Vconv of the converter 13 by switching from the constant-current control to the constant-voltage control. As a result, the output voltage V2 of the second DC voltage source 12 is maintained to be the rated voltage Vr.

Fourthly, when the output voltage V2 is more than the rated voltage Vr (for instance, when the rated voltage Vr is 100V, the output voltage V2 is 102V), the electric power transmission system 1 performs the regenerative operation and supplies (returns) the electric power (energy) to the first DC voltage source 11 from the second DC voltage source 12. In this case, when the output voltage V2 is more than the output voltage V1 (for instance, when the output voltage V1 is 90V), the electric power transmission system 1 performs the operation in the fourth quadrant and supplies the electric power to the first DC voltage source 11. Therefore, the instruction in which an operation quadrant corresponds to the fourth quadrant is input to the control unit. As a result, the control unit generates the driving signals Sa, Sb, Sc, Sd, Se1, Se2, Sf1, Sf2, Sg1, Sg2, Sh1 and Sh2 at the timing shown in FIG. 3 and outputs these driving signals to the first power conversion unit 21 and the second power conversion unit 22.

In the electric power transmission system 1, the first power conversion unit 21 and the second power conversion unit 22 of the converter 13 perform the chopper operations at the timings (shown in FIG. 3) of the driving signals Sa, Sb, Sc, Sd, Se1, Se2, Sf1, Sf2, Sg1, Sg2, Sh1 and Sh2. As a result, a discharging is possible in a state in which a current value of a discharging current is controlled. Further, electric power that the first DC voltage source 11 receives is equal to electric power that the second DC voltage source 12 outputs.

Specifically, because an expression, V2−V1>0, is satisfied in the operation in the fourth quadrant, a voltage difference (V2−V1), in which the voltage (the output voltage V2) of the second DC input and output terminal Q1 has a higher potential with respect to the voltage (the output voltage V1) of the second DC input and output terminal Q2 as a reference voltage, is generated between the second DC input and output terminals Q1 and Q2 as shown in FIG. 2.

As a result, only certain switches are turned ON at certain periods as explained below. A power transmission occurs in each of two periods T1 and T2 in one cycle T with respect to the driving signals Sa–Sh2 shown in FIG. 3. During the period T1, in the second power conversion unit 22, the bidirectional switches 41 and 44 shift to be in the ON states by the driving signals Se1, Se2, Sh1 and Sh2. On the other hand, the bidirectional switches 42 and 43 are controlled to be in the OFF states. The second power conversion unit 22 is completely configured with the bidirectional switches 41, 42, 43 and 44. Thus, even when the voltage having any polarity is applied to both terminals of any of the bidirectional switches 41, 42, 43 and 44 while they are in the OFF states, it is possible to prevent an electric current from passing between the both terminals. In the first power conversion unit 21, only the switches 31 and shift to be in the ON states by the driving signals Sa and Sd. It is not required that the switches 31 and 34 are in the ON states because of the diodes 35 and 38. However, it is possible to decrease an internal loss by turning ON the switches 31 and 34.

Figure 11:
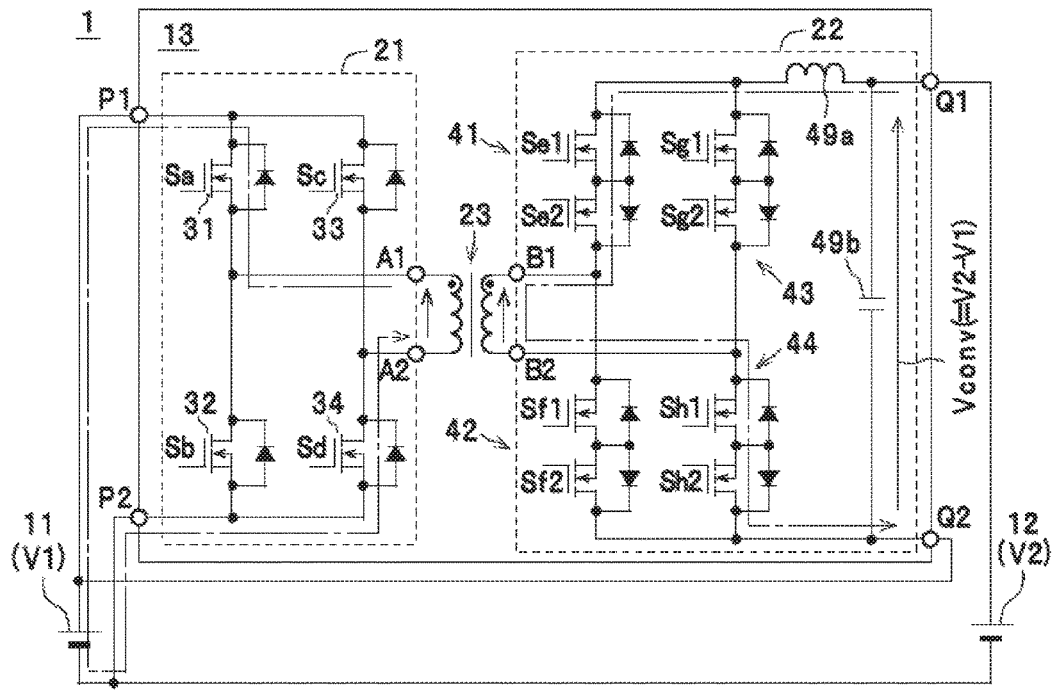
FIG. 11 is a circuit diagram for explaining an operation in the fourth quadrant of the series compensating electric power transmission system 1 according to an embodiment of the present invention.

As a result, as shown in FIG. 11, in the second power conversion unit 22, an electric current based on the output voltage V2 and the series compensating electric power (the voltage difference (V2−V1)×(the regenerative current from the second DC voltage source 12)) flows in a path (a path shown by an alternate long and short dash line) starting from the second DC input and output terminal Q1 on the high potential side and ending to the second DC input and output terminal Q2 on the low potential side, via the coil 49a, the bidirectional switch 41 being in the ON state, the secondary winding of the isolation transformer 23 and the bidirectional switch 44 being in the ON state. Further, in the first power conversion unit 21, an electric current based on a voltage (a voltage in which a polarity is shown in FIG. 11 in regards to the AC voltage V3) that is induced at the primary winding of the isolation transformer 23 flows in a path (a path shown by an alternate long and short dash line) starting from the first AC input and output terminal A1 of the primary winding of the isolation transformer 23 and ending to the first AC input and output terminal A2 of the primary winding of the isolation transformer 23, via the switch 31 being in the ON state by the driving signals Sa, the first DC voltage source 11, and the switch 34 being in the ON state by the driving signals Sd. That is, during the period T1, the converter 13 applies the compensation voltage Vconv (the voltage difference and the compensation voltage Vconv that is an enough voltage value to flow the electric current), which corresponds to the voltage difference between the output voltages V1 and V2 with the same polarity as the output voltage V1, to both terminals of the capacitor 49b. Thus, the converter 13 itself performs the regenerative operation and supplies (returns) a part of electric power, which is output from the second DC voltage source 12, to the first DC voltage source 11.

Further, during the period T2 explained above and shown in FIG. 3, in the second power conversion unit 22, the bidirectional switches 42 and 43 shift to be in the ON states by the driving signals Sf1, Sf2, Sg1 and Sg2. On the other hand, the bidirectional switches 41 and 44 are controlled to be in the OFF states. Further, in the first power conversion unit 21, only the switches 32 and 33 shift to be in the ON states by the driving signals Sb and Sc. It is not required that the switches 32 and 33 are in the ON states because of the diodes 36 and 37. However, it is possible to decrease an internal loss by turning ON the switches 32 and 33.

Figure 12:
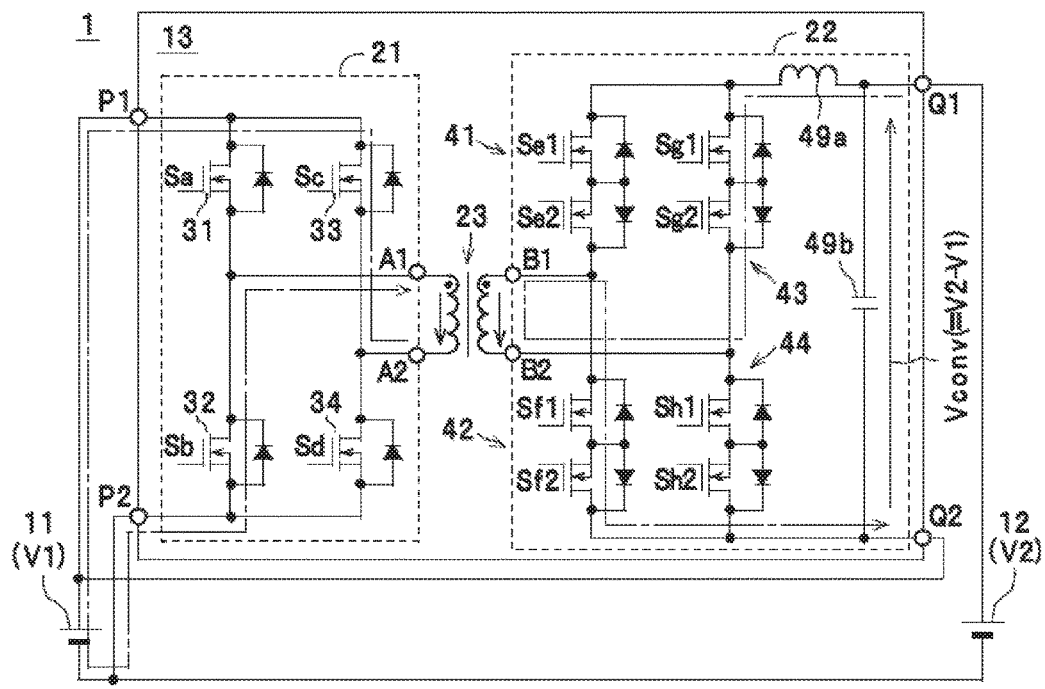
FIG. 12 is another circuit diagram for explaining the operation in the fourth quadrant of the series compensating electric power transmission system 1 according to an embodiment of the present invention.

As a result, as shown in FIG. 12, also during the period T2 explained above, in the second power conversion unit 22, an electric current based on the output voltage V2 and the series compensating electric power (the voltage difference (V2−V1)×(the regenerative current from the second DC voltage source 12)) flows in a path (a path shown by an alternate long and short dash line) starting from the second DC input and output terminal Q1 on the high potential side and ending to the second DC input and output terminal Q2 on the low potential side, via the coil 49a, the bidirectional switch 43 being in the ON state, the secondary winding of the isolation transformer 23 and the bidirectional switch 42 being in the ON state. Further, in the first power conversion unit 21, an electric current based on a voltage (a voltage in which a polarity is shown in FIG. 12 in regards to the AC voltage V3) that is induced at the primary winding of the isolation transformer 23 flows in a path (a path shown by an alternate long and short dash line) starting from the first AC input and output terminal A2 of the primary winding of the isolation transformer 23 and ending to the first AC input and output terminal A1 of the primary winding of the isolation transformer 23, via the switch 33 being in the ON state by the driving signal Sc, the first DC voltage source 11, and the switch 32 being in the ON state by the driving signal Sb. That is, in the same manner as the period T1, also during the period T2, the converter 13 applies the compensation voltage Vconv (the voltage difference and the compensation voltage Vconv that is an enough voltage value to flow the electric current), which corresponds to the voltage difference between the output voltages V1 and V2 with the same polarity as the output voltage V1, to both terminals of the capacitor 49*b*. Thus, the converter 13 itself performs the regenerative operation and supplies (returns) a part of electric power, which is directly output from the second DC voltage source 12, to the first DC voltage source 11.

As discussed above, in the electric power transmission system 1, because the converter 13 performs the regenerative operation, a part of electric power, which is supplied to the first DC voltage source 11 from the second DC voltage source 12, is returned to the first DC voltage source 11 via the converter 13. Further, an amount of the return is controlled during each of the periods T1 and T2 explained above shown in FIG. 3. As a result, the current value of a regenerative current that is supplied to the first DC voltage source 11 from the second DC voltage source 12 is controlled (for instance, is controlled to be a constant current value). Therefore, during both of the periods T1 and T2 in each cycle T, because a voltage (V2−Vconv) obtained by deducting the compensation voltage Vconv from the output voltage V2 is higher than the output voltage V1, the electric power that is discharged from the second DC voltage source 12 is supplied (is returned) to the first DC voltage source 11 via the converter 13.

At this time, the output voltage V2 of the second DC voltage source 12 gradually decreases by the discharging operation, and as a result, the voltage difference (V2−V1) gradually decreases. At this time, the control unit makes the compensation voltage Vconv decrease according to the decrease of the output voltage V2 by controlling timings of the driving signals Sa, Sb, Sc, Sd, Se1, Se2, Sf1, Sf2, Sg1, Sg2, Sh1 and Sh2. As a result, in the electric power transmission system 1, the output voltage (the compensation voltage) Vconv of the converter 13 is controlled and the electric power that is returned to the first DC voltage source 11 is adjusted until the output voltage V2 decreases and reaches the rated voltage Vr. As a result, the electric power is discharged from the second DC voltage source 12 in a constant-current control mode in which a charging current value is controlled indirectly. While a part of the discharging power explained above is returned (subtracted) to the first DC voltage source 11 via the converter 13, the operations (the regenerate operation of the electric power transmission system 1) for supplying the charging power to the first DC voltage source 11 continues.

Further, after the output voltage V2 approaches and is close to the rated voltage Vr, the control unit controls the timings of the driving signals Sa, Sb, Sc, Sd, Se1, Se2, Sf1, Sf2, Sg1, Sg2, Sh1 and Sh2 and controls the applied voltage (the compensation voltage) Vconv to the converter 13 by switching from the constant-current control to the constant-voltage control. As a result, the output voltage V2 of the second DC voltage source 12 is maintained to be the rated voltage Vr.

As explained above, in the electric power transmission system 1, the second power conversion unit 22 is configured with the bidirectional switches 41, 42, and 44. As a result, the converter 13, which is configured with only the first power conversion unit 21, the second power conversion unit 22 and the isolation transformer 23, can perform the operations in each of the four quadrants so as to transmit the electric power bidirectionally between the first DC voltage source 11 and the second DC voltage source 12.

Figure 3:
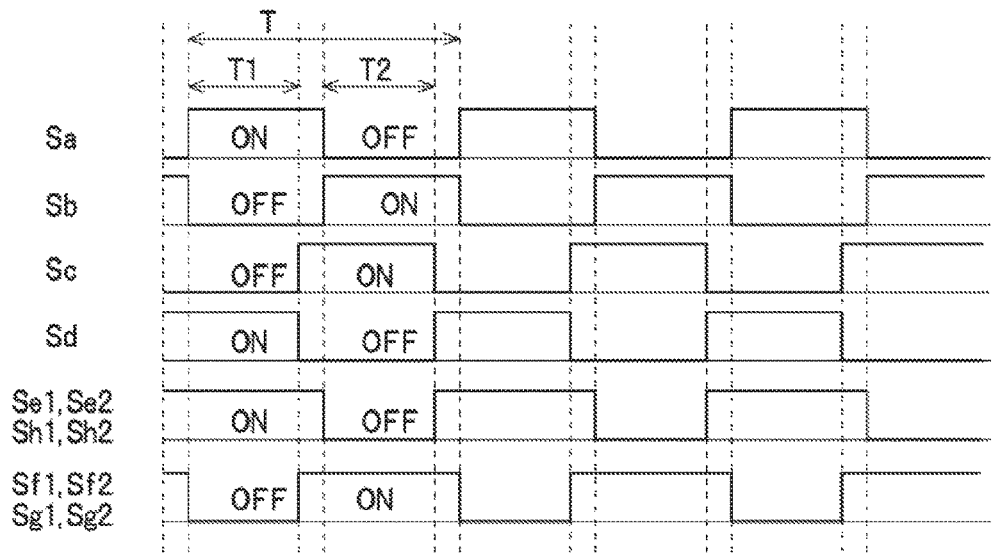
FIG. 3 is a timing diagram of driving signals Sa-Sd, Se1, Se2, Sf1, Sf2, Sg1, Sg2, Sh1, and Sh2, that are respectively output to switches 31-34 and 41-44, which configures the converter 13, when an output voltage V1 is less than an output voltage V2 according to an embodiment of the present invention.
Figure 4:
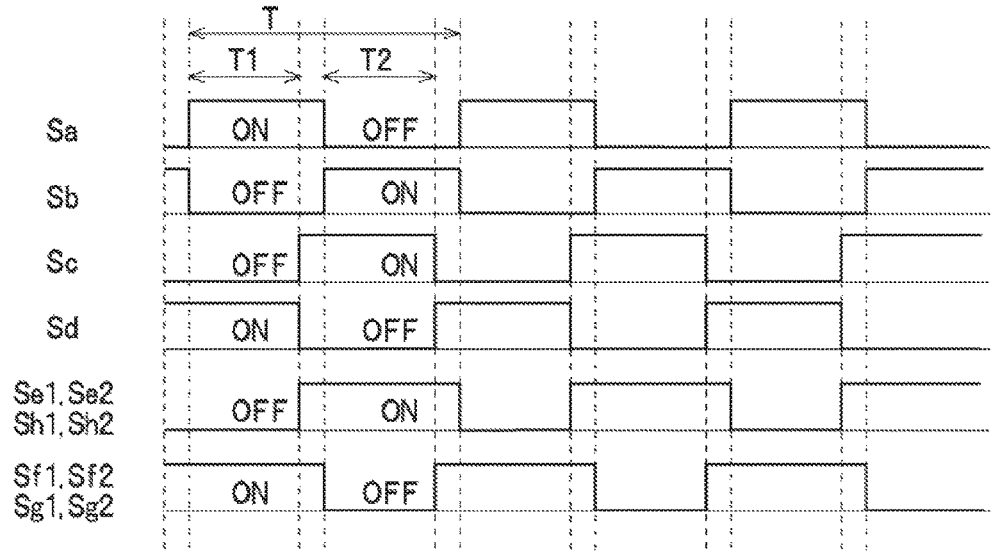
FIG. 4 is a timing diagram of the driving signals Sa-Sd, Se1, Se2, Sf1, Sf2, Sg1, Sg2, Sh1, and Sh2, that are respectively output to switches 31-34 and 41-44, which configures the converter 13, when the output voltage V1 is more than the output voltage V2 according to an embodiment of the present invention.

Further, the electric power transmission system according to the embodiments of the present invention can standardize the timings (use the common timings) of the driving signals Sa, Sb, Sc, Sd, Se1, Se2, Sf1, Sf2, Sg1, Sg2, Sh1 and Sh2 in the first and fourth quadrants as shown in FIG. 3, and at the same time, can standardize the timings of the driving signals Sa, Sb, Sc, Sd, Se1, Se2, Sf1, Sf2, Sg1, Sg2, Sh1 and Sh2 in the second and third quadrants as shown in FIG. 4. As a result, the control of the converter 13 can be simplified.

Further, in the electric power transmission system 1 according to the embodiments of the present invention, each of the bidirectional switches 41, 42, 43 and 44 is configured with a pair of the unidirectional switches (the switches 41*a* and 41*b* for the bidirectional switch 41, the switches 42*a* and 42*b* for the bidirectional switch 42, the switches 43*a* and 43*b* for the bidirectional switch 43, and switches 44*a* and 44*b* for the bidirectional switch 44) as the unidirectional switching elements that are connected in series in an opposite direction to each other, i.e., in a state in which current flow directions of the two unidirectional switching elements are opposite to each other, and a pair of the diodes (the diode 45*a* and 45*b* for each of the switches 41*a* and 41*b*, the diodes 46*a* and 46*b* for each of the switches 42*a* and 42*b*, the diodes 47*a* and 47*b* for each of the switches 43*a* and 43*b*, and the diodes 48*a* and 48*b* for each of the switches 44*a* and 44*b*) that are connected to each of the unidirectional switching elements in parallel in an opposite direction each other, i.e., in a reversed polarity state (a conducting direction is opposite to a conducting direction of a unidirectional switch). As a result, each of the bidirectional switches 41, 42, 43 and 44 can be easily configured by using the general electronic components.

Further, the converter 13 that is used in the electric power transmission system 1 explained above adopts the configuration in which each of the bidirectional switches 41, 42, 43 and 44 of the second power conversion unit 22 is driven in a synchronous system as shown in FIGS. 3 and 4 (the configuration in which a pair of the switches that configure each of the bidirectional switches 41, 42, 43 and 44 are turned ON and OFF at the same time). However, though an illustration is omitted from the drawings, a configuration in which each of the bidirectional switches 41, 42, 43 and 44 is driven in an asynchronous system can also be adopted. Specifically, in regards to the asynchronous system configuration explained above, for instance, in operations in the first and fourth quadrants, while the switches 41*b*, 42*b*, 43*b* and 44*b* are driven to be in the ON state all the time, only the switches 41*a*, 42*a*, 43*a* and 44*a* are turned ON and OFF at the timings shown in FIG. 3. On the contrary, in operations in the second and third quadrants, while the switches 41*a*, 42*a*, 43*a* and 44*a* are driven to be in the ON state all the time, only the switches 41*b*, 42*b*, 43*b* and 44*b* are turned ON and OFF at the timings shown in FIG. 4.

Figure 13:
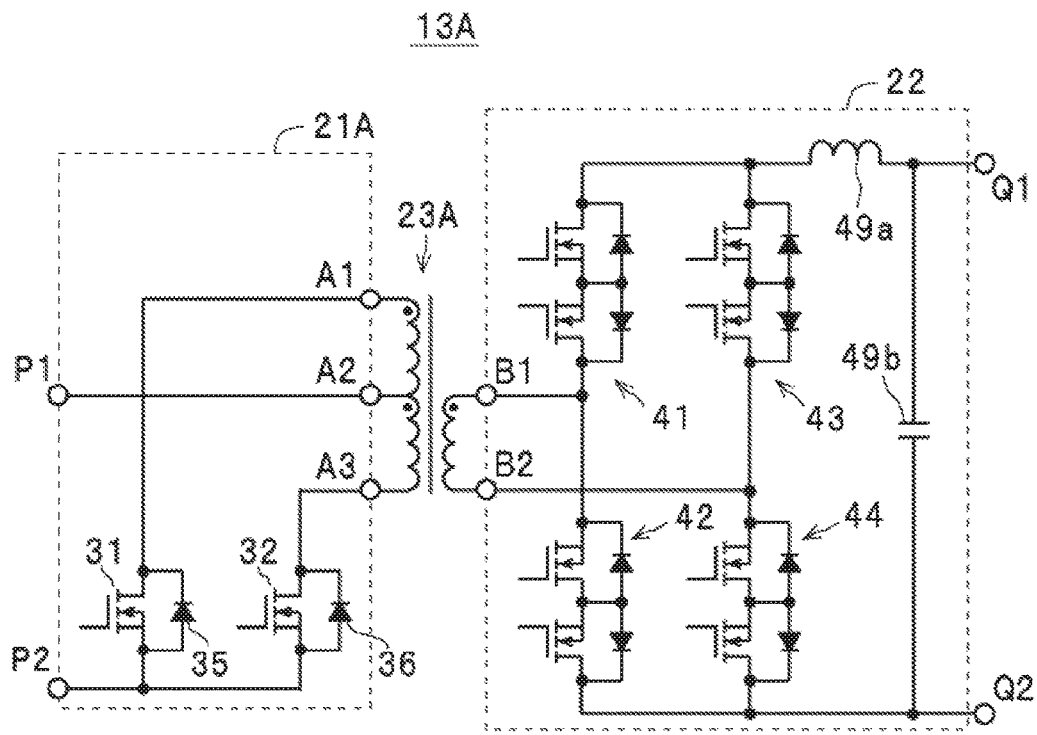
FIG. 13 is a circuit diagram of another converter 13A that is used in the series compensating electric power transmission system 1 according to an embodiment of the present invention.

Further, because the converter 13 that is used in the electric power transmission system 1 explained above is not limited to the configuration explained above, various insulated type bidirectional converters can be used. For instance, a converter 13A shown in FIG. 13 can also be used. An isolation transformer 23A in the converter 13A has a configuration in which a center tap is placed at a primary winding so that the primary winding has three terminals. Therefore, a first power conversion unit 21A in the converter 13A is configured as a push-pull type power conversion circuit by having three first AC input and output terminals A1, A2 and A3 that are connected to the three terminals of the primary winding. Further, the redundant explanations with respect to the same configurations as the converter 13 are omitted but the same reference numerals are used for labeling.

The electric power transmission system 1 in which the converter 13A is used can also achieve the same effects as the electric power transmission system 1 in which the converter 13 is used.

Figure 14:
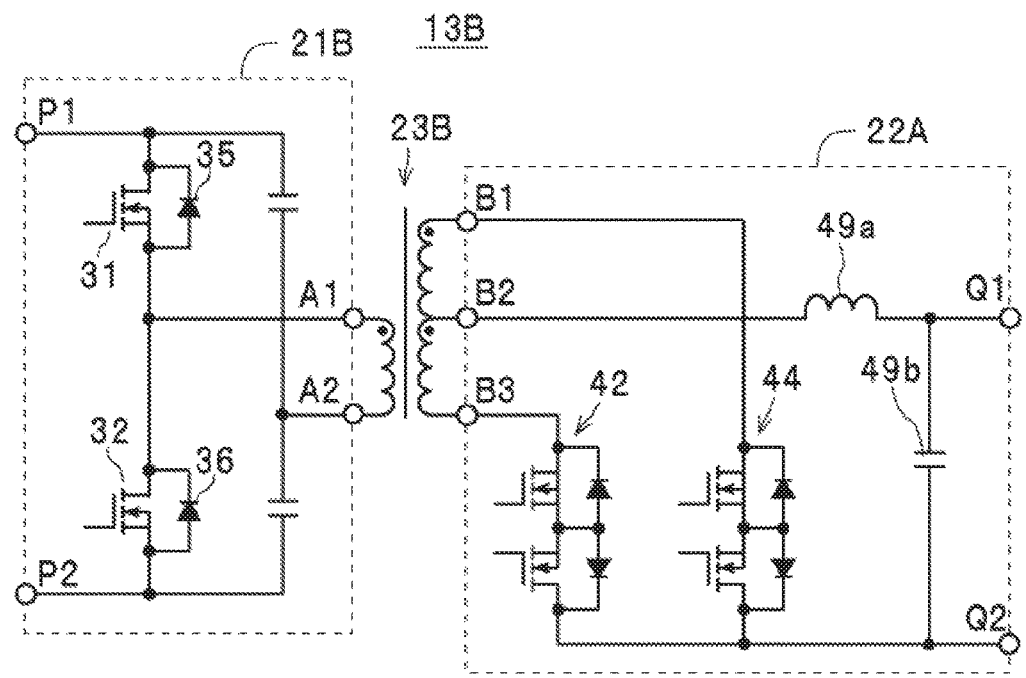
FIG. 14 is a circuit diagram of another converter 13B that is used in the series compensating electric power transmission system 1 according to an embodiment of the present invention.

In addition, a converter 13B shown in FIG. 14 can also be used. The converter 13B is configured with a first power conversion unit 21B, a second power conversion unit 22A and an isolation transformer 23B. Further, the redundant explanations with respect to the same configurations as the converters 13 and 13A are omitted but the same reference numerals are used for labeling.

The first power conversion unit 21B in the converter 13B is configured as a half bridge type power conversion circuit by replacing the switches 33 and 34 in the first power conversion unit 21 to capacitors. Further, the isolation transformer 23B in the converter 13B has a configuration in which a center tap is placed at a secondary winding so that the secondary winding has three terminals. Therefore, the second power conversion unit 22A is configured as a push-pull type power conversion circuit (the power conversion circuit that has the bidirectional switches 42 and 44) by having three second AC input and output terminals B1, B2 and B3 that are connected to the three terminals of the secondary winding.

Figure 15:
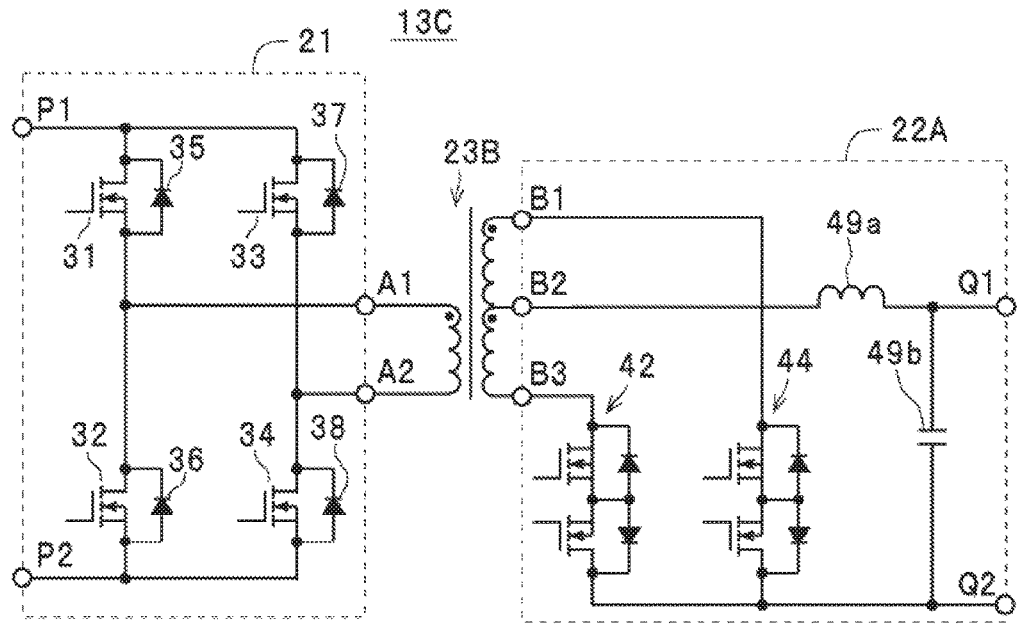
FIG. 15 is a circuit diagram of another converter 13C that is used in the series compensating electric power transmission system 1 according to an embodiment of the present invention.

Further, a converter 13C shown in FIG. 15 can also be used. The converter 13C is configured with the first power conversion unit 21 that is the same in the converter 13, the second power conversion unit 22A and the isolation transformer 23B that are the same in the converter 13B. Further, the redundant explanations with respect to the same configurations as the converters 13, 13A and 13B are omitted but the same reference numerals are used for labeling.

Figure 16:
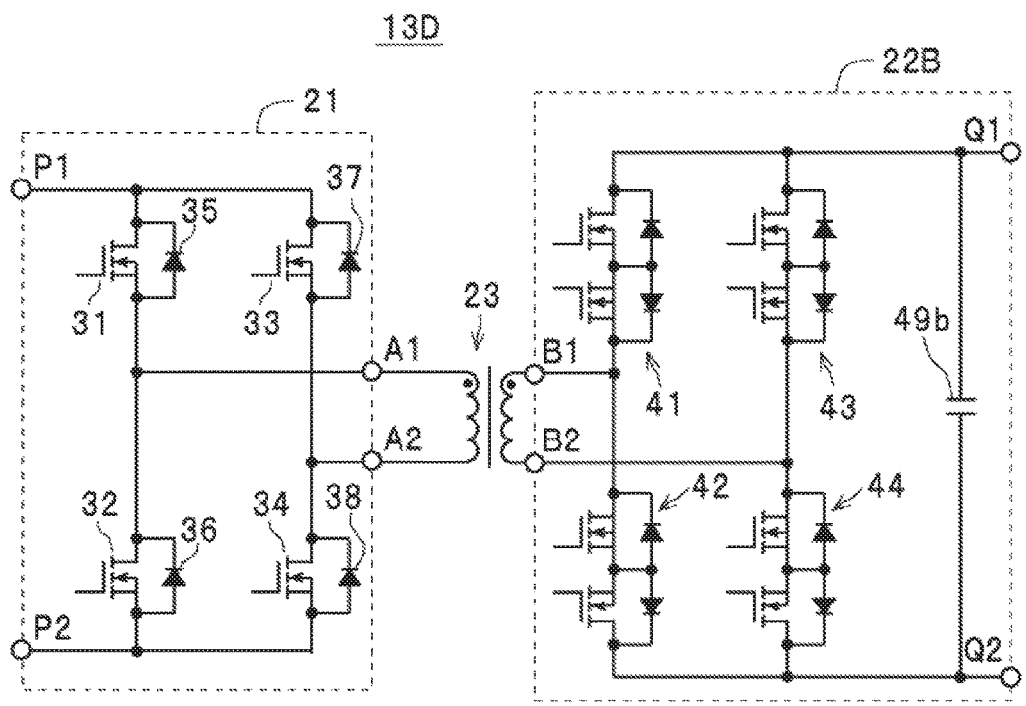
FIG. 16 is a circuit diagram of another converter 13D that is used in the series compensating electric power transmission system 1 according to an embodiment of the present invention.
Figure 17:
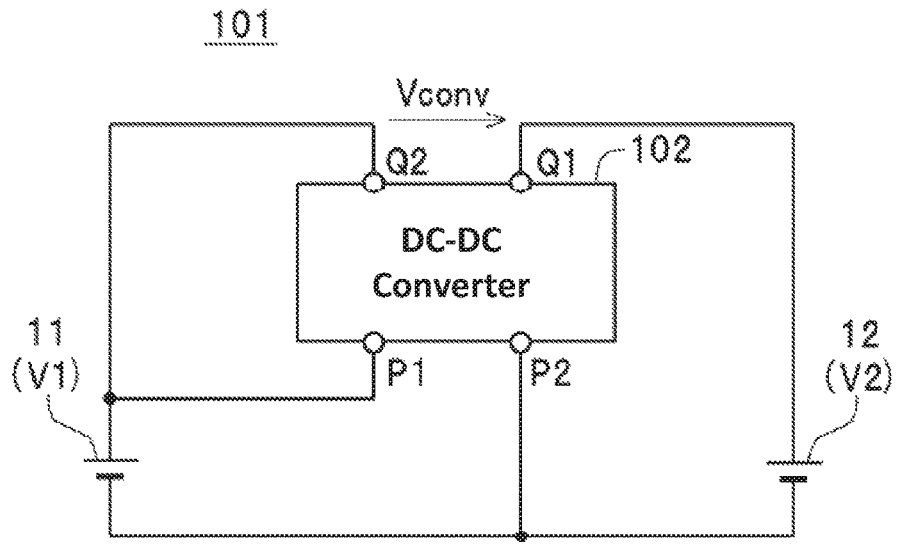
FIG. 17 is a basic circuit diagram of a series compensating electric power transmission system 101.
Figure 18:
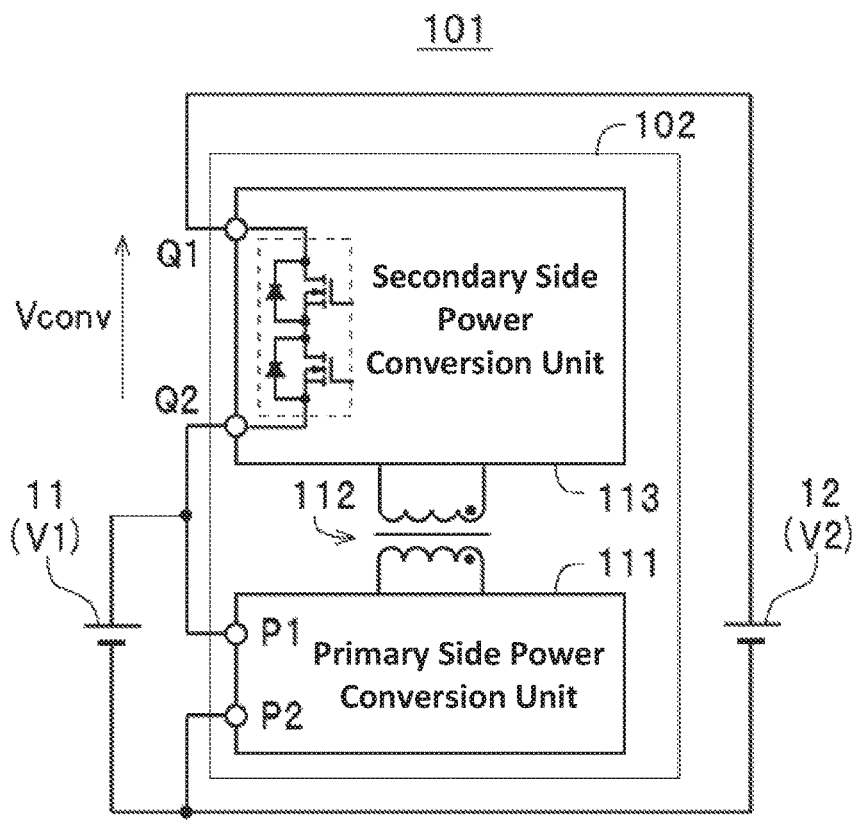
FIG. 18 is a circuit diagram of the series compensating electric power transmission system 101 and a conventional converter 102 being located in the series compensating electric power transmission system 101.

Further, a converter 13D shown in FIG. 16 can also be used. The converter 13D has the first power conversion unit 21 and the isolation transformer 23 that are the same in the converter 13, and a second power conversion unit 22B (a circuit configuration in which the coil 49a is removed from the second power conversion unit 22) so as to configure a dual active bridge type converter. Further, the redundant explanations with respect to the same configurations as the converter 13 are omitted but the same reference numerals are used for labeling.

The electric power transmission system 1 in which any of the converters 13B, 13C and 13D explained above is used can also achieve the same effects as the electric power transmission system 1 in which the converter 13 is used.

The series compensating electric power transmission system being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A series compensating electric power transmission system, comprising:
    a first direct current voltage source that has a first voltage source positive terminal and a first voltage source negative terminal;
    a second direct current voltage source that has a second voltage source positive terminal and a second voltage source negative terminal; and
    a bidirectional DC-DC converter, the bidirectional DC-DC converter includes:
        a pair of first direct current input and output terminals configured with a first I/O positive terminal and a first I/O negative terminal, the first I/O positive terminal being connected to the first voltage source positive terminal, the first I/O negative terminal being connected to the first voltage source negative terminal;
        a pair of second direct current input and output terminals configured with a second I/O positive terminal and a second I/O negative terminal, the second I/O negative terminal being connected to the first voltage source positive terminal, the second I/O positive terminal being connected to the second voltage source positive terminal;
        a first power converter having the pair of first direct current input and output terminals and a pair of first alternating current input and output terminals, the first power converter configured to bidirectionally perform power conversion between a first direct current voltage generated between the pair of first direct current input and output terminals and a first alternating current voltage generated between the pair of first alternating current input and output terminals;
        a second power converter having the pair of second direct current input and output terminals and a pair of second alternating current input and output terminals, the second power converter configured to bidirectionally perform power conversion between a second direct current voltage generated between the pair of second direct current input and output terminals and a second alternating current voltage generated between the pair of second alternating current input and output terminals; and
        an isolation transformer having a primary winding and a secondary winding, the primary winding being connected to the pair of first alternating current input and output terminals, the secondary winding being connected to the pair of second alternating current input and output terminals,
    wherein the first power converter has a plurality of first switches, and the plurality of first switches are connected to each other in one of push-pull, half bridge and full bridge configurations,
    the second power converter has a plurality of second switches, and the plurality of second switches are connected to each other in one of push-pull and full bridge configurations,
    the plurality of first switches and the plurality of second switches perform ON and OFF operations based on the first and second direct current voltages,
    wherein the plurality of second switches of the second power converter are a plurality of bidirectional switches, and the plurality of bidirectional switches are connected to each other in one of a push-pull configuration or a full bridge configuration, and
    each of the plurality of first switches of the first power converter has a single unidirectional switching element, and each of the plurality of bidirectional switches of the second power converter has two unidirectional switching elements so that a configuration of each of the plurality of first switches of the first power converter is different from a configuration of each of the plurality of bidirectional switches of the second power converter.

2. The series compensating electric power transmission system according to claim 1, wherein each of the plurality of bidirectional switches of the second power converter is configured with the two unidirectional switching elements and two diodes, the two unidirectional switching elements are connected in series in a state in which current flow directions of the two unidirectional switching elements are opposite to each other, the two diodes are connected in series in a state in which current flow directions of the two diodes are opposite to each other, and the two unidirectional switching elements and the two diodes are connected in parallel, respectively, in a reversed polarity state.

3. The series compensating electric power transmission system according to claim 1,
wherein each of the plurality of first switches of the first power converter is configured with the single unidirectional switching element and a single diode, and
the single unidirectional switching element and the single diode are connected in parallel in an opposite polarity to each other.

4. The series compensating electric power transmission system according to claim 2,
wherein each of the plurality of first switches of the first power converter is configured with the single unidirectional switching element and a single diode, and
the single unidirectional switching element and the single diode are connected in parallel in an opposite polarity to each other.

5. The series compensating electric power transmission system according to claim 1,
wherein the bidirectional DC-DC converter is configured to perform a four-quadrant chopper operation, and the four-quadrant chopper operation is configured with:
a first quadrant operation in a first quadrant in which when the first direct current voltage is smaller than the second direct current voltage, the bidirectional DC-DC converter is configured to perform a power-running operation so as to output a compensation voltage based on the first direct current voltage;
a second quadrant operation in a second quadrant in which when the first direct current voltage is larger than the second direct current voltage, the bidirectional DC-DC converter is configured to perform a regenerative operation so as to put electric power back to the first direct current voltage source based on a voltage difference between the first and second direct current voltages;
a third quadrant operation in a third quadrant in which when the first direct current voltage is larger than the second direct current voltage, the bidirectional DC-DC converter is configured to perform the power-running operation so as to output the compensation voltage based on the first direct current voltage; and
a fourth quadrant operation in a fourth quadrant in which when the first direct current voltage is smaller than the second direct current voltage, the bidirectional DC-DC converter is configured to perform a regenerative operation so as to put the electric power back to the first direct current voltage source based on the voltage difference between the first and second direct current voltages.

6. A series compensating electric power transmission system, comprising:
a first direct current voltage source that has a first voltage source positive terminal and a first voltage source negative terminal;
a second direct current voltage source that has a second voltage source positive terminal and a second voltage source negative terminal; and
a bidirectional DC-DC converter, the bidirectional DC-DC converter includes:
a pair of first direct current input and output terminals configured with a first I/O positive terminal and a first I/O negative terminal, the first I/O positive terminal being connected to the first voltage source positive terminal, the first I/O negative terminal being connected to the first voltage source negative terminal;
a pair of second direct current input and output terminals configured with a second I/O positive terminal and a second I/O negative terminal, the second I/O negative terminal being connected to the first voltage source positive terminal, the second I/O positive terminal being connected to the second voltage source positive terminal;
a first power converter having the pair of first direct current input and output terminals and a pair of first alternating current input and output terminals, the first power converter configured to bidirectionally perform power conversion between a first direct current voltage generated between the pair of first direct current input and output terminals and a first alternating current voltage generated between the pair of first alternating current input and output terminals;
a second power converter having the pair of second direct current input and output terminals and a pair of second alternating current input and output terminals, the second power converter configured to bidirectionally perform power conversion between a second direct current voltage generated between the pair of second direct current input and output terminals and a second alternating current voltage generated between the pair of second alternating current input and output terminals; and
an isolation transformer having a primary winding and a secondary winding, the primary winding being connected to the pair of first alternating current input and output terminals, the secondary winding being connected to the pair of second alternating current input and output terminals,
wherein the first power converter has a plurality of first switches, and the plurality of first switches are connected to each other in one of push-pull, half bridge and full bridge configurations,
the second power converter has a plurality of second switches, and the plurality of second switches are connected to each other in one of a push-pull configuration or a full bridge configuration,
the plurality of first switches and the plurality of second switches perform ON and OFF operations based on the first and second direct current voltages, and
wherein the bidirectional DC-DC converter is configured to perform a four-quadrant chopper operation, and the four-quadrant chopper operation is configured with:
a first quadrant operation in a first quadrant in which when the first direct current voltage is smaller than the second direct current voltage, the bidirectional DC-DC converter is configured to perform a power-running operation so as to output a compensation voltage based on the first direct current voltage;
a second quadrant operation in a second quadrant in which when the first direct current voltage is larger than the second direct current voltage, the bidirectional DC-DC converter is configured to perform a regenerative operation so as to put electric power back to the first direct current voltage source based on a voltage difference between the first and second direct current voltages;

a third quadrant operation in a third quadrant in which when the first direct current voltage is larger than the second direct current voltage, the bidirectional DC-DC converter is configured to perform the power-running operation so as to output the compensation voltage based on the first direct current voltage; and a fourth quadrant operation in a fourth quadrant in which when the first direct current voltage is smaller than the second direct current voltage, the bidirectional DC-DC converter is configured to perform a regenerative operation so as to put the electric power back to the first direct current voltage source based on the voltage difference between the first and second direct current voltages.

7. The series compensating electric power transmission system according to claim 6, wherein each of the plurality of second switches of the second power converter is configured with two unidirectional switching elements and two diodes, the two unidirectional switching elements are connected in series in a state in which current flow directions of the two unidirectional switching elements are opposite to each other, the two diodes are connected in series in a state in which current flow directions of the two diodes are opposite to each other, and the two unidirectional switching elements and the two diodes are connected in parallel, respectively, in a reversed polarity state.

8. The series compensating electric power transmission system according to claim 6, wherein each of the plurality of first switches of the first power converter is configured with a single unidirectional switching element and a single diode, and the single unidirectional switching element and the single diode are connected in parallel in an opposite polarity to each other.

9. The series compensating electric power transmission system according to claim 7, wherein each of the plurality of first switches of the first power converter is configured with a single unidirectional switching element and a single diode, and the single unidirectional switching element and the single diode are connected in parallel in an opposite polarity to each other.

* * * * *